United States Patent
Hofmeister et al.

(10) Patent No.: US 11,787,671 B2
(45) Date of Patent: *Oct. 17, 2023

(54) CONTROL STAND FOR A CRANE, EXCAVATOR, AND THE LIKE

(71) Applicant: Liebherr-Werk Biberach GmbH, Biberach an der Riss (DE)

(72) Inventors: Markus Hofmeister, Biberach an der Riss (DE); Günter Trieloff, Leutkirch (DE); Hermann Schilling, Assmannshardt (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,563

(22) Filed: May 23, 2022

(65) Prior Publication Data

US 2022/0388816 A1 Dec. 8, 2022

Related U.S. Application Data

(63) Continuation of application No. 16/359,737, filed on Mar. 20, 2019, now Pat. No. 11,339,036, which is a
(Continued)

(30) Foreign Application Priority Data

Sep. 20, 2016 (DE) ...................... 10 2016 011 354.5

(51) Int. Cl.
*B60R 1/00* (2022.01)
*B60R 11/04* (2006.01)
(Continued)

(52) U.S. Cl.
CPC ......... *B66C 13/54* (2013.01); *B60H 1/00357* (2013.01); *B60K 35/00* (2013.01);
(Continued)

(58) Field of Classification Search
CPC ........... B66C 13/54; B60R 1/00; B60K 35/00; H04N 7/181; E02F 9/267; E02F 9/2012; E02F 9/2004; E02F 9/166; G06F 3/011
See application file for complete search history.

(56) References Cited

U.S. PATENT DOCUMENTS 6,293,033 B1 9/2001 Moriya et al.
6,744,372 B1 6/2004 Shaw et al.
(Continued)

FOREIGN PATENT DOCUMENTS

CN 102282317 12/2011
CN 104798354 7/2015
(Continued)

OTHER PUBLICATIONS

"How to: Touchpad—Mercedes-Benz Owners Support". YouTube, uploaded by Mercedes-Benz USA, Jul. 14, 2014, www.youtu.be/JxJIIH5He5o. (Year: 2014).

*Primary Examiner* — Yuri Kan
(74) *Attorney, Agent, or Firm* — Levine Bagade Han LLP

(57) ABSTRACT

A control stand is disclosed for controlling a crane, an excavator, a crawler, or a similar construction machine having a seat, control elements actuable from the seat for inputting control commands, a display apparatus for displaying information, and a control unit for generating adjustment signals in dependence on input control commands and/or for providing information to the display apparatus. A crane is disclosed having such a control stand that can be configured in the form of a crane operator's cabin. The control elements and/or the display apparatus of the control stand and various further auxiliary units can be individually configurable. Personal pre-settings can be saved and can be reinvoked when the control stand or the crane is to be controlled by a certain machine operator.

20 Claims, 15 Drawing Sheets

Related U.S. Application Data continuation of application No. PCT/EP2017/001104, filed on Sep. 19, 2017.

(51) Int. Cl.
| | |
|---|---|
| B60K 35/00 | (2006.01) |
| B62D 49/00 | (2006.01) |
| B66C 13/54 | (2006.01) |
| B60H 1/00 | (2006.01) |
| B60K 37/06 | (2006.01) |
| B60N 2/02 | (2006.01) |
| B60N 2/04 | (2006.01) |
| B60R 22/46 | (2006.01) |
| B66C 13/44 | (2006.01) |
| B66C 13/56 | (2006.01) |
| B66C 15/06 | (2006.01) |
| E02F 9/16 | (2006.01) |
| E02F 9/20 | (2006.01) |
| E02F 9/26 | (2006.01) |
| G06F 3/01 | (2006.01) |
| G06F 3/0481 | (2022.01) |
| G06F 3/0484 | (2022.01) |
| B66C 13/40 | (2006.01) |
| G02B 27/00 | (2006.01) |
| G06F 3/038 | (2013.01) |
| G02B 27/01 | (2006.01) |
| G05B 19/042 | (2006.01) |

(52) U.S. Cl.
CPC ............ *B60K 37/06* (2013.01); *B60N 2/0224* (2013.01); *B60N 2/04* (2013.01); *B60R 1/00* (2013.01); *B60R 22/46* (2013.01); *B66C 13/40* (2013.01); *B66C 13/44* (2013.01); *B66C 13/56* (2013.01); *B66C 15/065* (2013.01); *E02F 9/166* (2013.01); *E02F 9/2012* (2013.01); *E02F 9/26* (2013.01); *G02B 27/0093* (2013.01); *G02B 27/01* (2013.01); *G05B 19/0426* (2013.01); *G06F 3/013* (2013.01); *G06F 3/017* (2013.01); *G06F 3/038* (2013.01); *G06F 3/0481* (2013.01); *G06F 3/0484* (2013.01); *B60K 2370/61* (2019.05); *B60K 2370/736* (2019.05); *B60K 2370/741* (2019.05); *B60K 2370/744* (2019.05); *B60R 2300/207* (2013.01); *B60R 2300/802* (2013.01); *B60Y 2200/41* (2013.01)

(56) References Cited

U.S. PATENT DOCUMENTS

| | | | |
|---|---|---|---|
| 9,758,116 B2 | 9/2017 | Xiong et al. | |
| 9,908,531 B1 | 3/2018 | Claywell et al. | |
| 11,339,036 B2* | 5/2022 | Hofmeister | G06F 3/011 |
| 2005/0083907 A1* | 4/2005 | Fishler | H04L 29/06 |
| | | | 370/352 |
| 2005/0151845 A1* | 7/2005 | Tsukada | E02F 9/26 |
| | | | 348/148 |
| 2007/0233378 A1 | 10/2007 | Tanaka et al. | |
| 2008/0231744 A1* | 9/2008 | Khanna | H04N 5/225 |
| | | | 348/373 |
| 2010/0070179 A1* | 3/2010 | Cameron | B66C 13/46 |
| | | | 701/301 |
| 2010/0147640 A1* | 6/2010 | Jones | F16F 9/53 |
| | | | 188/267.2 |
| 2012/0234617 A1* | 9/2012 | Suneya | B60K 35/00 |
| | | | 180/78 |
| 2012/0242687 A1 | 9/2012 | Choi | |
| 2013/0044080 A1 | 2/2013 | Chiang | |
| 2013/0307771 A1 | 11/2013 | Parker et al. | |
| 2014/0161578 A1* | 6/2014 | Kimura | E02F 9/2004 |
| | | | 414/687 |
| 2014/0165159 A1 | 6/2014 | Baade et al. | |
| 2014/0184643 A1 | 7/2014 | Friend | |
| 2014/0190046 A1* | 7/2014 | Shibata | E02F 9/2012 |
| | | | 37/403 |
| 2014/0354813 A1* | 12/2014 | Ishimoto | B60R 1/00 |
| | | | 348/148 |
| 2015/0161872 A1 | 6/2015 | Beaulieu et al. | |
| 2015/0191178 A1 | 7/2015 | Roy et al. | |
| 2015/0199106 A1 | 7/2015 | Johnson | |
| 2015/0279123 A1 | 10/2015 | Yamanobe et al. | |
| 2015/0308074 A1 | 10/2015 | Zhdanov et al. | |
| 2016/0004305 A1* | 1/2016 | Pagliani | G06Q 10/063114 |
| | | | 345/633 |
| 2016/0109701 A1 | 4/2016 | Goldman-Shenhar et al. | |
| 2016/0193920 A1* | 7/2016 | Tsubone | E02F 9/16 |
| | | | 701/36 |
| 2016/0214482 A1 | 7/2016 | Kim | |
| 2016/0368452 A1* | 12/2016 | Le | B60R 21/01538 |
| 2017/0031339 A1* | 2/2017 | Corbeil | G06Q 50/08 |
| 2017/0050491 A1* | 2/2017 | Boehme | B60H 1/00842 |
| 2017/0120820 A1* | 5/2017 | Petzold | E02F 9/24 |
| 2017/0220112 A1* | 8/2017 | Nakamura | B06B 1/0611 |
| 2017/0261978 A1 | 9/2017 | Gresch | |
| 2017/0305018 A1* | 10/2017 | Machida | E02F 9/267 |
| 2018/0065641 A1* | 3/2018 | Claywell | B60W 50/0098 |
| 2018/0080198 A1* | 3/2018 | Machida | H04N 7/181 |
| 2018/0188530 A1* | 7/2018 | Kasazumi | G02B 27/0093 |
| 2019/0138959 A1* | 5/2019 | Shike | G05B 23/02 |
| 2019/0276281 A1 | 9/2019 | Hofmeister et al. | |

FOREIGN PATENT DOCUMENTS

| | | | | |
|---|---|---|---|---|
| DE | 20201955 | 5/2002 | | |
| DE | 10204498 | 8/2003 | | |
| DE | 102004014333 | 2/2007 | | |
| DE | 102012208970 | 12/2013 | | |
| DE | 102013100419 | 7/2014 | | |
| DE | 102014215117 | 2/2015 | | |
| DE | 102013019335 | 5/2015 | | |
| DE | 102013223684 | 5/2015 | | |
| DE | 102014222426 | 5/2016 | | |
| JP | 2000-247572 | 9/2000 | | |
| JP | 2002-307978 | 10/2002 | | |
| JP | 2002307978 | 10/2002 | | |
| JP | 2002307978 A | * 10/2002 | ............ | B60K 35/00 |
| JP | 2009-173195 | 8/2009 | | |
| WO | WO 2018/054530 | 3/2018 | | |

* cited by examiner

CONTROL STAND FOR A CRANE, EXCAVATOR, AND THE LIKE

CROSS-REFERENCE TO RELATED APPLICATIONS

This application is a continuation of U.S. patent application Ser. No. 16/359,737 filed Mar. 20, 2019, which is a continuation of International Application No. PCT/EP2017/001104, filed Sep. 19, 2017, which claims priority to German Patent Application No. 10 2016 011 354.5, filed Sep. 20, 2016, the contents of each of which are incorporated herein by reference in their entirety for all purposes.

BACKGROUND

The present invention relates to a control stand for controlling a crane, an excavator, a crawler, or a similar construction machine having a seat, a plurality of control elements actuable from the seat for inputting control commands, at least one display apparatus for displaying information, and a control unit for generating adjustment signals in dependence on input control commands and/or for providing information to the display apparatus. The invention further relates to a crane having such a control stand that can in particular be configured in the form of a crane operator's cabin.

Cranes such as revolving tower cranes comprise a crane operator's cabin as the control stand that is able to move along with certain crane movements and that can be attached to the tower of the crane, for example. Such crane operator's cabins typically comprise a seat from where the crane operator can actuate various control elements such as joysticks, control buttons, regulators, sliders, and the like to be able to input control commands for the crane. Said control elements are here arranged distributed around the seat, for example at chair arms or at holders in front of the seat so that the machine operator can reach them comfortably. In addition, displays are typically arranged in the field of vision in front of the seat to be able to display relevant information to the crane operator; for example, service information, operating instructions, or camera images from cameras that are positioned at the crane or in the crane environment. Different displays are here typically provided for different information functions; for example, a display for the crane data, a camera display, and a further display for the operation of the working area monitoring and interference monitoring.

Such crane operator's cabins can be equipped with various auxiliary units that do not directly control the key functions of the machine or of the crane, but rather increase the comfort of the machine operator and make the operation safer. Such auxiliary units can, for example, be an air conditioning system for regulating the climate in the crane operator's cabin, an audio system having a microphone and a loudspeaker for communication with persons in the crane environment or with other persons relevant for the construction site, a lighting system for lighting the crane operator's cabin and/or the crane environment, or a windshield wiper for wiping the crane operator's windows. Corresponding control elements that are in addition to the control elements that control the actual crane functions and machine functions are typically provided for controlling these additional auxiliary units so that the problem arises with the corresponding number of control elements of arranging them all compactly within the reach of the machine operator.

Additionally, there is the aggravating feature in this respect that not all machine operators are the same size or have arms of the same length and that there are both right-handers and left-handers among crane operators. In addition, different crane operators also develop different preferences and intuitive automatisms that arise by many years of controlling a specific crane type. Meeting these different demands equally to enable a simple, comfortable, and intuitive, and thus safe, operation of the crane for every machine operator is difficult and has only been unsatisfactorily resolved up to now.

SUMMARY

It is therefore the underlying object of the present invention to provide an improved control stand of the said kind and an improved crane equipped therewith, to avoid the disadvantages of the prior art, and to develop the latter in an advantageous manner. A more comfortable, an intuitive, and thus a safe operability of the control stand should in particular be achieved that takes account of the differences of individual machine operators and that equally remains clearly arranged.

In accordance with the invention, the named object is achieved by a control stand in accordance with claim 1 and by a crane in accordance with claim 37. Preferred embodiments of the invention are the subject of the dependent claims.

It is therefore proposed in accordance with a first aspect of the invention to configure the control elements and/or the display apparatus of the control stand and/or further auxiliary units as individually configurable and to save and to reinvoke personal pre-settings when the control stand or the crane is to be controlled by a certain machine operator. In accordance with the invention, an adjustment apparatus is provided for setting and saving individual pre-settings of operating parameters and/or operating functions of the control elements and/or of the display apparatus and/or of further auxiliary units and an identification device is provided for identifying a respective machine operator with reference to a detectable identification feature, with the control unit being configured to automatically provide the saved pre-settings with reference to a respective detected identification feature. The control stand can hereby be preconfigured using individual preferences and/or ergonomic or physical properties of a respective machine operator so that an intuitive and hereby safe crane operation can be achieved and time can be saved on a change of crane operator.

In a further development of the invention, the control elements and/or the display apparatus and/or the further auxiliary units have different pre-settable operating parameters and/or operating functions. The control elements can, for example, comprise a mechanically movable control lever that is configured as adjustable with respect to its movement resistance and/or its return force and/or return speed and/or its lever length. The movement resistance preferred by a machine operator and/or the return characteristics and/or the lever length can be set and saved using said setting apparatus, with the stored characteristics being saved together with an identifying feature of the machine operator to automatically invoke and carry out the pre-setting when the machine operator is identified again with reference to this identification feature.

A respective machine operator can be identified with respect to different identification features in this respect. For example, one or more biometric features such as a fingerprint, an iris pattern, a voice frequency pattern and/or ergonomic facial characteristics can be detected and saved via a biometric detection device and are then detected and compared with saved data on a repeat start of the crane.

Alternatively or additionally to such a biometric recognition, an identification can, however, also take place using an electronic code that is associated with a machine operator in the form of a numerical code that is queried by the display apparatus and/or that is to be input on or before a putting into operation of the crane via input means at the control stand or beforehand, for example via a keypad that can be displayed on a touchscreen. Alternatively or additionally, the crane operator can also be equipped with a data communication means, for example in the form of a transponder or of a magnetic strip card or with a personally encoded key that can be read by a detection device at the control stand.

Alternatively or additionally, a preconfiguration of the control stand can also take place from an external control device that is separate from the crane or from the machine and that can communicate data with the crane or with the construction machine. For example, a supervisor of the machine operator can communicate a work plan and a job list for the specific machine operator via a central online management system to the control apparatus, for example in that the identification code identifying the machine operator is transmitted so that the control stand can already be individually configured in advance.

Alternatively or additionally to the previously named pre-setting of the control elements, they can also be configured as variably functionalizable and can have different control functions assigned to them, for example such that the raising and lowering of the hoisting gear and the slewing of the crane can be assigned optionally to a right joystick and the traveling of the trolley can be assigned to a left joystick or said assignments can also be provided in a converse manner.

Alternatively or additionally to such a preconfiguration of the control elements, the display apparatus can also be configured as pre-adjustable in different manners. For example, different display fields can be displaced to different regions of a display or of a display surface, which can then be saved in a personalized manner and can be reinvoked again in a corresponding manner. Alternatively or additionally, different display interfaces can also be configured on which different display fields can be differently or individually combined, for example such that each user can place his preferred or most frequently used display fields on a specific display interface that can be invoked as a preference interface, for example.

If the display apparatus comprises at least one touchscreen, provision can advantageously be made that the positions of control keys or control touch pads or input pads displayed there can be displaced and/or their response sensitivity can be variably adjusted and/or can have different control functions assigned them in the previously named manner, which can in turn be saved and reinvoked again in a personalized manner.

Such a touchscreen can advantageously be provided with and/or coupled to a biometric sensor so that on touching the touchscreen, a fingerprint pattern detectable in so doing can be used for an automatic invoking and carrying out of the pre-setting saved for this purpose. For example, an input pad or touch pad defined for the index finger can be displaced or provided where the index finger is placed and a fingerprint pattern of the finger placed down is determined.

The display apparatus can generally comprise touchscreens positioned at different points. In accordance with a further aspect of the present invention, such a touchscreen can be provided on the surface of at least one control lever that is movably supported and/or is provided with a suitable detection device with a rigid storage to detect movement pressure and/or movement drag and/or movement torque. The function of a control lever can be expanded by the attachment of a touchscreen to the surface of such a control lever. On the one hand, control commands can be generated via the touchscreen on the surface of the control lever; for example, by swiping movements and/or pressing movements on control panels. Alternatively or additionally, such a touchscreen can be used for displaying information on the control lever to illustrate the functionality of the control lever to the machine operator. Alternatively or additionally, a biometric detection can also take place via such a touchscreen at the control lever. Said touchscreen can advantageously be three-dimensional and/or can be integrated in the curved contour of the control lever.

Alternatively or additionally to such a touchscreen at the surface of a control lever, the display apparatus can also have a touchscreen, preferably likewise three-dimensional, about a chair arm at the seat of the control stand, with such a touchscreen being able to extend, for example, at both sides and/or in the form of a multi-limb, in particular U-shaped touchscreen body on a plurality of sides of the chair arm.

Alternatively or additionally, a touchscreen can also be integrated in the surface of the chair arm itself and/or can form the surface of the chair arm.

Alternatively or additionally, at least one large-area touchscreen can be attached to a cabin wall and/or cabin glazing of the control stand and/or can at least partially form this cabin wall and/or cabin glazing, with the aforesaid term glazing naturally also being able to mean plastic materials. Alternatively or additionally, at least one display interface and/or touch control interface can also be displayed on or projected onto a cabin wall or cabin glazing, for example by a head-up display that can preferably display a display interface and/or control interface over a large area at least a significant portion of the cabin wall and/or cabin glazing.

Alternatively or additionally to said touchscreens via which control commands can be input, the control elements can also have a gesture detection device by means of which small or large body movements of the machine operator can be detected and converted into control commands. Finger movements such as swiping movements of a finger can, for example, be detected as small gestures. Hand movements or arm movements or head movements such as a shaking of the head or also foot movements can be detected as larger body movements. Desired actuations of control elements that are shown on the display interface and/or control interface that are projected or displayed in another manner, for example on the cabin wall or cabin glazing can be detected and converted into control commands by means of such a gesture detection device.

In accordance with a further aspect of the present invention, the positions of the display elements and/or of the soft keys on the display surface of the display apparatus and/or of its touchscreen can also be dynamically changed, and indeed in dependence on movements and/or positions and/or the direction of gaze of the machine operator. For this purpose, suitable detection means can be provided at the control stand that detect the movements and/or positions, for example of the hands of the machine operator, and/or his direction of gaze and/or head posture to allow the display fields and/or soft keys to move along, for example, with the hand and/or the direction of gaze and/or to displace them in dependence on these detected parameters.

Alternatively or additionally, the positions of the display elements and/or of the soft keys on the display surface of the display apparatus and/or its touchscreen can also be dynamically displaced in dependence on movements and/or positions of the load take-up means or of another relevant machine element of the machine to be controlled from the control stand. Such a position control of the display elements and/or control elements starts from the consideration that the axis of view of the machine operator in many cases or frequently substantially follows the load take-up means.

In accordance with a further aspect, the seat of the control stand and/or its orientation can also be individually adapted to the respective machine operator, with respectively preferred settings advantageously being able to be saved and invoked again as personalized pre-settings. Independently of this, an automatic adaptation of the seat to the physical stature of the operator can be provided, wherein detection means for detecting the physical stature can, for example, comprise pressure sensors in the seat surface and/or an optical sensor system for detecting the size and/or the physical volume of the machine operator. A seat control apparatus can adapt different seat parameters such as the seat surface hardness, seat surface height, width setting of cheeks and/or spring hardness or damping hardness automatically or semiautomatically in dependence on the detected physical stature features or on the corresponding sensor system signals.

The orientation of the seat can advantageously also be dynamically variable in operation and can be automatically controlled, in particular in dependence on a respective detected direction of gaze of the crane operator and/or in dependence on a load position, which can be detected by suitable detection means and can be converted by a seat control apparatus into a corresponding movement of the seat, for example a tilting forward of the seat when the load hook is led close to the tower and to the ground.

Alternatively or additionally, an automatic tensioning and/or positioning of straps and/or holding hoops can also be provided, which can advantageously take place automatically in dependence on a tilting of the seat. A holding strap or holding hoop can in particular be tautened when the seat is tilted to the front and/or is loosened again when the seat is tilted back again.

The control stand can furthermore have a multi-zone air conditioning system for a zone-wise differing regulation of the air temperature and/or air quality and/or air humidity, with an air conditioning device, control device and/or regulation device having adjustment means for setting individual desired values for the different climate zones.

In this respect, the display apparatus can have a display interface for displaying the climate zones and the adjustment means can have a gesture and/or touch detection sensor system for detecting gestures and/or touches on the display interface.

The multi-zone air conditioning system is advantageously variably adjustable with respect to the size and/or position and/or contour of the climate zones relative to the seat.

Alternatively or additionally, the control stand can be characterized in that a communication apparatus is provided for communicating voice and/or text messages and is connected to the display apparatus that has a communication display interface for displaying communication information.

In this respect, the communication display interface can comprise a representation of the working area and of possible communication partners present therein, wherein marking means are provided for highlighting a communication partner to which a communication link has been or will be set up in the communication display interface and/or selection means are provided for selecting a communication partner displayed in the working area representation and the communication apparatus sets up a communication link to the selected communication partner in dependence on a selection made in the working area representation.

The control stand preferably comprises a collision checking apparatus that checks a possible collision with a communication partner present in the working area with reference to a current or planned travel path, with the communication apparatus being configured to automatically set up a communication link to the communication partner as soon as the collision checking apparatus determines a possible collision with said communication partner.

The communication apparatus can furthermore have an emergency call button for setting up an emergency call connection, with the communication apparatus being configured to transfer supplementary operating data comprising sensor data and/or camera images on a setting up of an emergency call connection.

A weather detection apparatus can furthermore be provided for detecting weather data and/or weather forecast data, with the communication apparatus advantageously being configured to set up a weather emergency call connection automatically in dependence on the detected weather data and/or weather forecast data.

In accordance with a further aspect, an active noise reduction apparatus for compensating environmental noise and/or for reducing sound exposure effective on the machine operator at the seat is associated with the control stand, with said active noise reduction apparatus comprising at least one sound detection sensor, in particular a microphone, and at least one sound generator for generating active noise, with an active noise control apparatus being provided to control the sound generator in dependence on a signal of the at least one sound detection sensor.

The at least one sound generator can comprise at least one vibrator that is attached to a cabin wall and/or cabin glazing and that is provided to make a cabin wall and/or cabin glazing vibrate.

A plurality of sound detection sensors are preferably provided of which at least one sound detection sensor is provided outside an operator's cabin, at least one sound detection sensor is provided inside the operator's cabin and/or is provided inside a double cabin wall. Alternatively or additionally, a plurality of active noise generators are provided of which at least one active noise generator is provided outside the operator's cabin; and at least one active noise generator is arranged inside the operator's cabin and/or inside a double cabin wall.

The control stand can furthermore have at least one windshield wiper apparatus having at least one windshield wiper for wiping operator's cabin glazing, with a wiping region of the windshield wiper being variably adjustable in dependence on at least one operating parameter of the control stand and/or of the machine to be controlled by the control stand.

A detection device can advantageously be provided for detecting a wiping resistance and/or a wiping obstacle, with the wiping region of the windshield wiper being limited in dependence on the detected wiping resistance and/or on the wiping obstacle to a wiping region in which the detected wiping resistance remains below a predefined limit value and/or is outside the wiping obstacle.

Alternatively or additionally, a raising apparatus can be provided for raising the windshield wiper away from the windshield glazing to be wiped and can be controllable in dependence on a signal of the detection apparatus such that the windshield wiper is raised over a detected wiping obstacle and/or a wiping region in which the detected wiping resistance exceeds a predefined limit value.

In accordance with a further aspect, a detection device is provided for detecting the head position and/or the direction of gaze of a machine operator and/or for detecting a load take-up means positon and/or a load position, with the wiping region of the windshield wiper being able to be set automatically in dependence on the detected direction of gaze and/or on the head position of the machine operator and/or in dependence on the detected load take-up means position and/or load position such that the wiping region of the windshield wiper moves along with the field of vision of the machine operator.

To control or set the wiping field, the windshield wiper can also have a length-variable wiper arm having an associated length setting actuator and/or a wiper drive can have an adjustable movement range.

In accordance with a further aspect, the control stand can have a lighting apparatus for lighting the control stand that can comprise a plurality of illuminants for lighting different lighting zones that are variably adjustable independently of one another with respect to their light color and/or with respect to their luminosity to generate different light colors and/or luminosities in different lighting zones.

A collision checking apparatus is furthermore preferably provided for checking possible collisions and a light control apparatus is provided for changing the light color and/or luminosity in a lighting zone facing a possible collision in dependence on a signal of the collision checking apparatus.

Alternatively or additionally, at least one brightness sensor is provided for detecting the brightness at the control stand, with a variable setting of the light color and/or luminosity taking place in dependence on a brightness signal of the brightness sensor.

The crane or the machine controlled by the control stand furthermore comprises a lighting apparatus for lighting the working area of the machine to be controlled by the control stand, with a plurality of illuminants preferably being provided for lighting different lighting zones, and with the illuminants being configured as individually controllable with respect to their light color and/or luminosity to generate different light colors and/or luminosities in different lighting zones.

At least one of the illuminants can also be variable in its orientation, with a control apparatus being able to be provided for controlling the orientation of this at least one illuminant in dependence on a load take-up means position and/or load position such that the lighting area generated by the illuminant automatically moves along with the load take-up means and/or the load.

Furthermore, at least one illuminant can be configured as variable with respect to the position and/or size and/or contour of the lighting zone lit by it and can be automatically controllable by a control apparatus in dependence on a current or planned travel path of the load take-up means such that the lighting zone generated by the illuminant marks and/or lights the travel path of the load take-up means.

BRIEF DESCRIPTION OF THE DRAWINGS

The invention will be explained in more detail in the following with reference to a preferred embodiment and to associated drawings. There are shown in the drawings.

DETAILED DESCRIPTION

The control stand explained in more detail with reference to the Figures in the following provides different innovations and can in particular be provided at the crane in the form of a crane operator's cabin, for example attached to the tower or to its slewing tip of a revolving tower crane. The control stand can, however, optionally also be used as a remote control stand separate from the crane or as a control stand for a different construction machine or for another conveyor such as a crawler, an excavator, a cable excavator, a surface miner, a dump truck, or similar machines.

As FIGS. 1a-1i illustrate, control levers of the control stand can have a return mechanism to automatically move into the neutral position in the unactuated state. To be able to adapt the operating feel of the counter-pressure that is generated by the return mechanism to the operator individually or also based on the situation, an implementation of the return mechanism can be applied using a combination of spring force and an electromagnet, cf. FIG. 1a, No. 101; a fixed magnet and an electromagnet, cf. FIGS. 1b and 1e, No. 102; an electrically deformable material, cf. FIG. 1c, No. 103; only using an electromagnet, cf. FIGS. 1d and 1h, No. 104; or a position-monitored and torque-monitored electrical drive fastened to the slewing axle and having a spring return or a magnet return, cf. FIG. 1g, No. 106.

The torque here can be freely configured, adapted to the respective operating situation in a personalized manner—e.g. such that a higher counter-pressure is provided for low speeds—and also a freely configurable, personalized lock-in position can be implemented in that the torque is increased or reduced based on the position. Travel movements are likewise also tactilely predefined to e.g. communicate specific positions of the master switch from assistance system to the operator tactilely and also over a display integrated in the control lever as well as via an LED display. They can likewise be configured in a personalized manner.

The applied torque can be determined by calculation or metrologically via strain gauges, the touch field or the touch display, via magnetic field sensors, or capacitively to compensate interference influences via a regulation. The electrically variable magnetic field can also be used for the determining of the position of the master switch position. A magnetic field sensor here detects the electrically variable magnetic field, whereby the position is determined. The fixed magnet can thereby be dispensed with.

Figure 1:
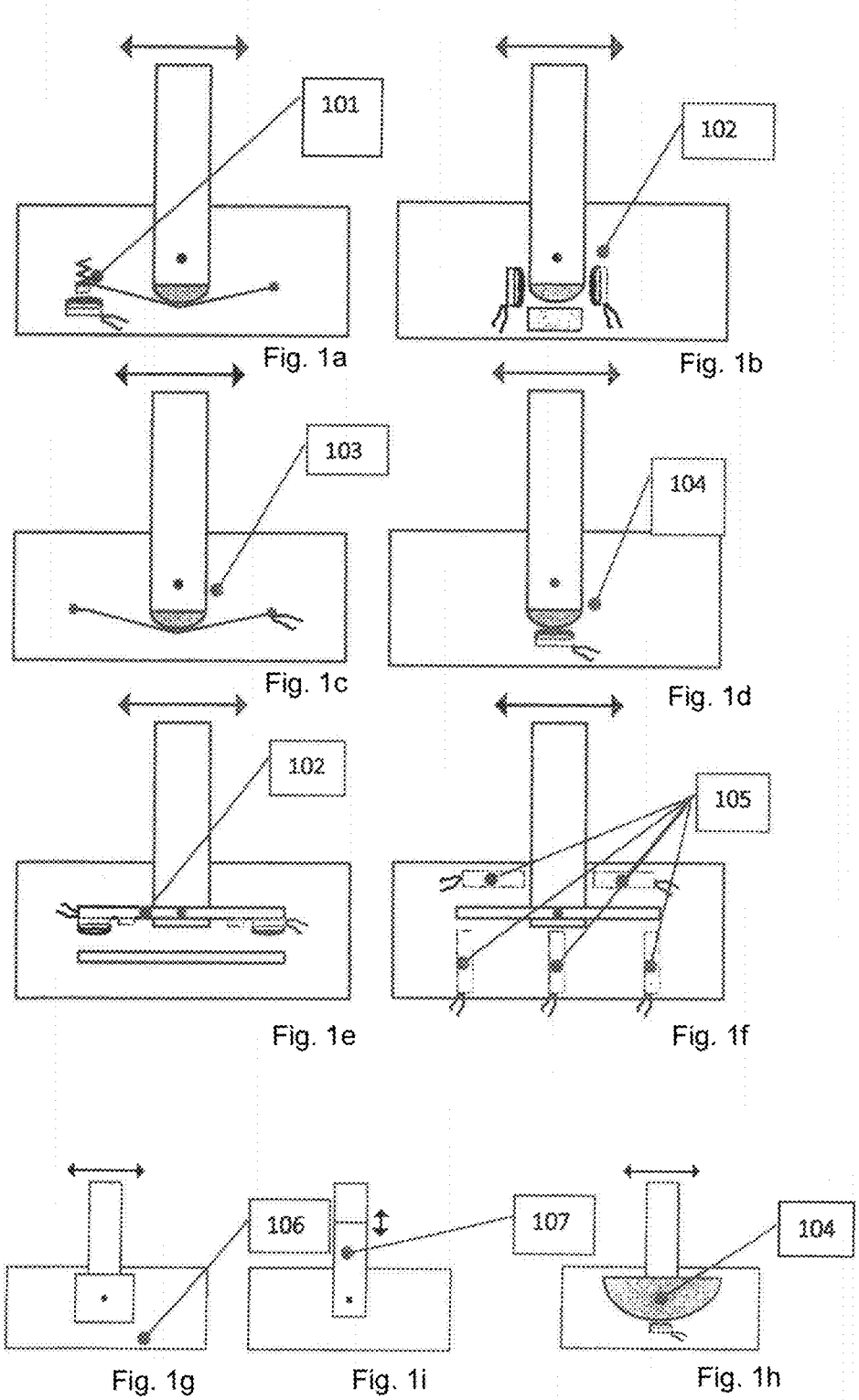
FIGS. 1a-1i: a schematic representation of a control lever of the control stand of a crane, with different performance options of a return apparatus for returning the control lever and a sensor system for detecting control lever movements and/or control lever actuation forces and control lever actuation torques being shown in the partial views in FIGS. 1a-h and with an adjustment apparatus for adjusting the lever length being shown in the partial view of FIG. 1i.

A further option provides the position detection via an inductive and capacitive sensor, cf. FIG. 1f, No. 105. The length of the control lever can be adjusted in a personalized manner via an electric drive, e.g. in the form of a spindle drive, or mechanically by a lock-in position and/or a clamping connection, cf. FIG. 1i, No. 107. Every operator can thereby set their desired length and can store this setting in personalized form in the crane control.

Figure 2:
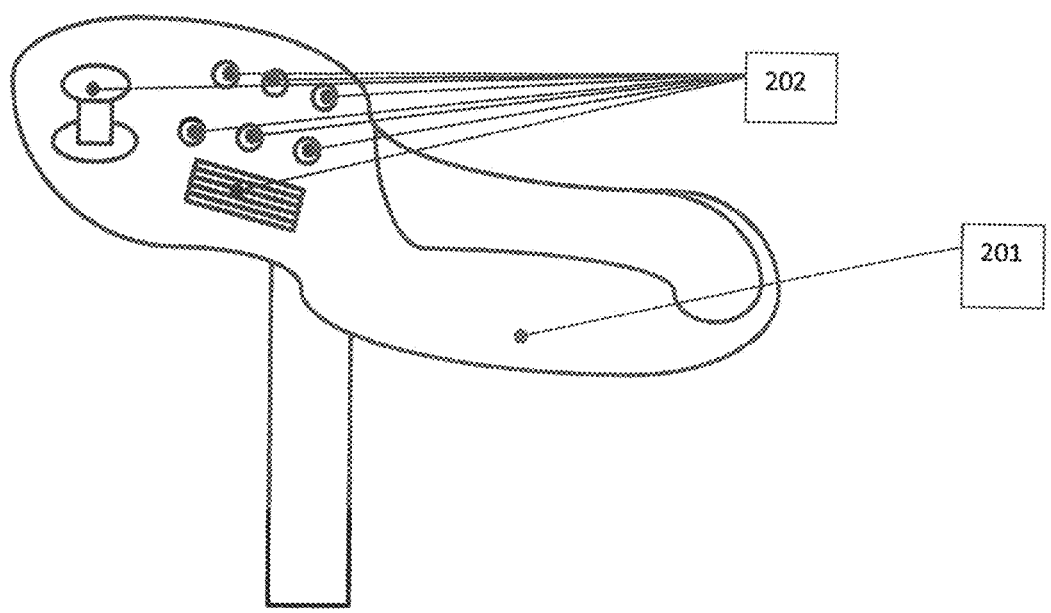
FIG. 2: a schematic representation of the gripping region of a control lever of the control stand and of the control elements that are attached to its surface and that are configured as configurable in a personalized manner.

The control levers (cf. FIG. 2, No. 201) of the control stand include freely configurable operating elements (cf. FIG. 2, No. 202), e.g. joysticks, buttons, scroll wheels, that can be configured in a personalized manner. There is thus the possibility for the crane operator to be able to assign all the functions for the operation and setting of the crane, of the pieces of equipment, of the cabin, of the display, of the control stand, and of the construction site management programs to the operating elements best suited for him.

Figure 3:
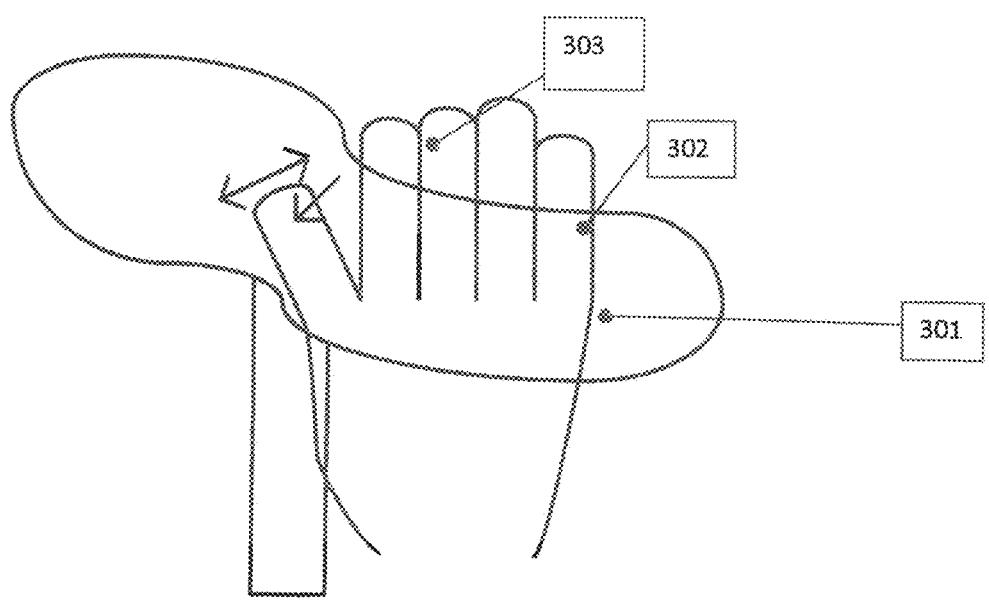
FIG. 3: a schematic representation of the gripping region of a control lever of the control stand at whose surface a three-dimensional touch display with a sensor surface is provided.

A further option provides an ergonomically haptic 3D touch display having a sensor surface (FIG. 3, No. 302) on the preferably total surface of the control lever (FIG. 3, No. 301). It detects, for example in a technical radar manner, optically, capacitively, resistively, acoustically and/or via electrically measureable changes, the finger print and the movement and/or the pressure of the applied fingers and hand (FIG. 3, No. 303). This enables the personalized assignment of all the functions for the operation and setting of the crane, of the pieces of equipment, of the cabin, of the display, of the control stand, and of the construction site management programs to the movement and/or pressure of defined fingers.

Operating commands defined in a personalized manner can hereby be carried out without looking for specific operating elements. The detection can likewise also be used for the implementation of the so-called dead man function. Which region of the hand should be detected, for example to implement said dead man function, can be determined in an individually personalized manner.

Information can also be presented on the control lever and active fingers that carry out a function can be illuminated, stored, or bordered, or marked in another manner by the visualization.

The surface structure of such a display or of a different display can also preferably be changed in an electrically personalized manner to make operating elements tangible, for example in that vibrations or even sound are/is generated. This enables the tactile feeling of operating elements, hazards, structures, and information on point-like or areal vibrations or noises to be transmitted to the operator.

Gestures and positions can likewise also be detected to carry out functions defined in a personalized manner for the operation and setting of the crane, of the pieces of equipment, of the cabin, of the display, of the control stand, and of the construction site management programs. Required and personalized information is faded in at free positions on the basis of the detection of the hand to ensure better clarity.

The positions of the display elements and personalized information are/is advantageously dynamically formed and change position on the movement of the hand and/or of the control lever to always be visible to the operator. Additional animations can provide additional required information such as the operation of the control lever or of the system to be operated.

A haptic 3D touch display (FIG. 4, No. 402) ergonomically attached around the chair arm (FIG. 4, No. 401) enables the individual personalized visualization of operating and display elements as well as required or personalized information (FIG. 3, No. 404). An optimum reachability and visibility of the operating and display elements and required and personalized information can thereby be achieved.

Figure 4:
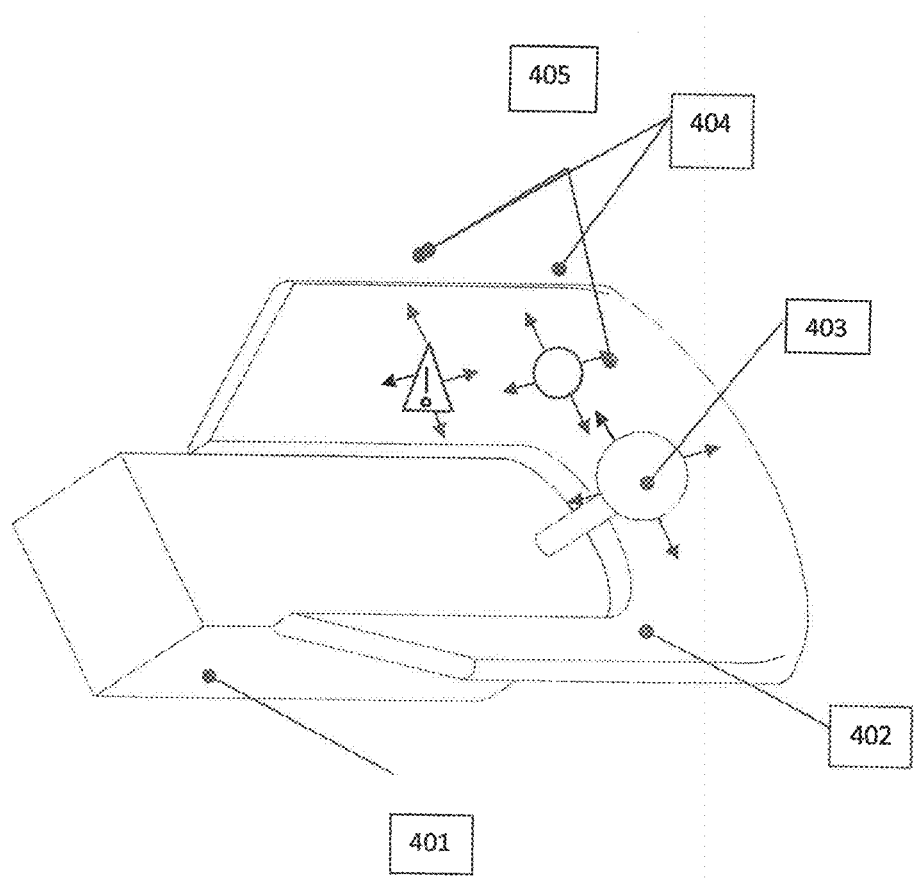
FIG. 4: a schematic representation of a three-dimensional touchscreen that is attached around the arm of the seat of the control stand and that is individually configurable with respect to its display elements and its control elements as well as its function and position.

Individual personalized functions for the operation and setting of the crane, of the pieces of equipment, of the cabin, of the display, of the control stand, and of the construction site management programs and/or of other functional modules can be assigned to the operating elements. The positions of the operating and display elements and personalized information are/is advantageously dynamic and can, for example, adapt to the movement of the control lever (FIG. 4, No. 403). The changes of the positions can likewise be configured in a personalized manner. This enables a very good reachability of all the operating elements in any position of the control lever.

The total display surface can advantageously be available for the movement of the operating and display elements (FIG. 4, No. 405).

The total construction site with the device to be controlled—that is in particular the building crane and optionally further construction machinery such as excavators, crawlers, etc.—can be imaged on this or on a different display and required situations can be marked or otherwise highlighted. Different camera positions and/or animations can advantageously be presented to the operator here based on personalized requirements. Required information can be tactilely emphasized. This simplifies the tactile feeling of information, hazards, structures, and control elements without having a direct view of the display.

Figure 5:
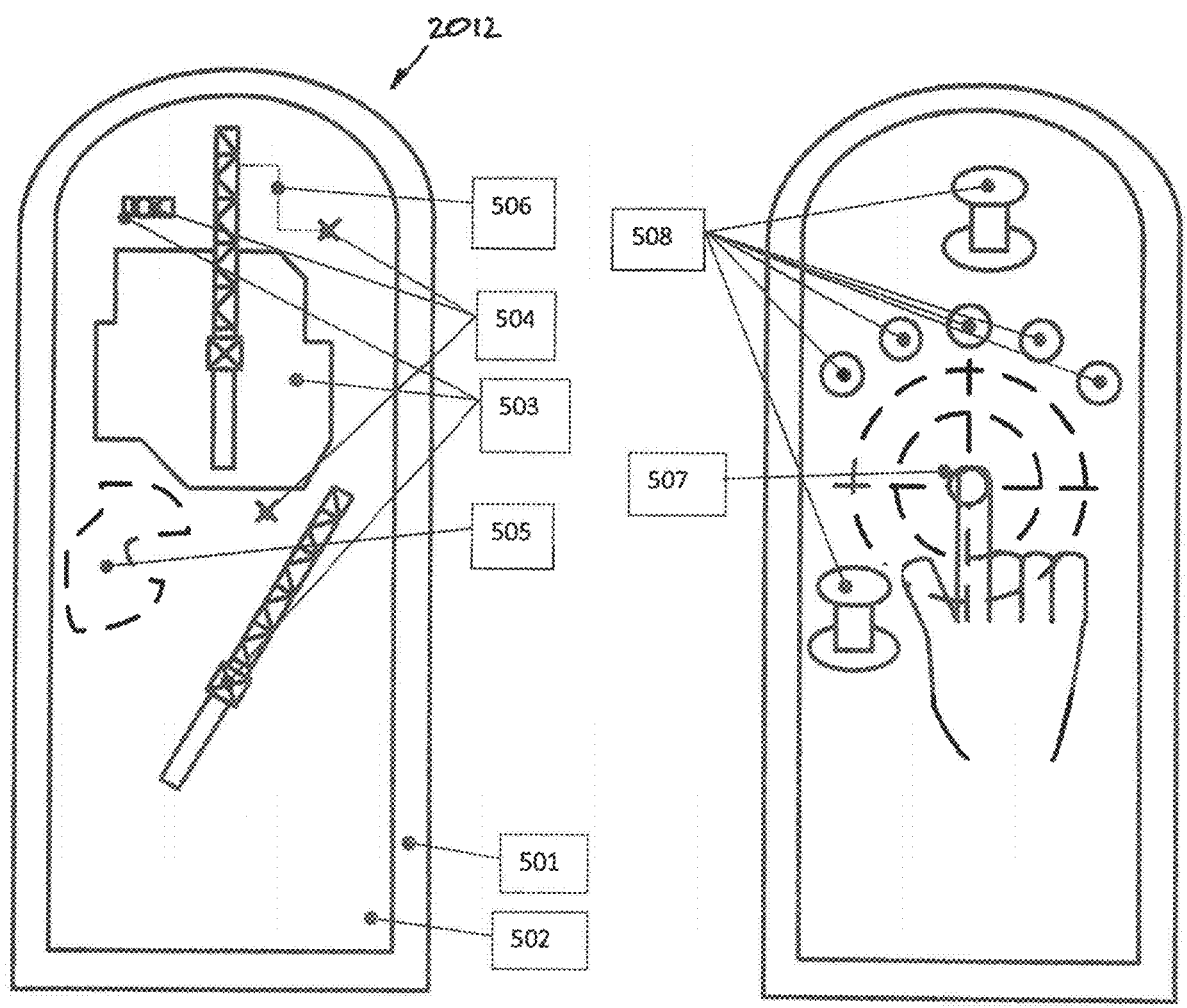
FIG. 5: a schematic representation of a touchscreen that forms the surfaces of the arm of the seat of the control stand.

For example, the desired destination positions (FIG. 5, No. 504) can be specified in an autonomously travelable or controlled crane, e.g. in the form of spatial points for the taking up and placing down of the load and/or a desired travel path, horizontally and/or vertically (FIG. 5, No. 506). The take-up and place-down destinations of the load and the travel paths can be prioritized here or can be shown in animated form on receipt of a job. Different shapes and colors as well as a dynamic numbering with figures and/or letters can be used for the individual personalized representation. The prioritization of the required work jobs is thereby presented in simplified form. The desired jobs can be communicated to the control by the construction site staff or by the construction site management via a radio or cable connection. Jobs of a plurality of cranes can thereby also be shown on the display.

There is also the possibility of taking over the control of a different device over a radio or cable connection, whereby a plurality of devices can be operated by one crane operator. Blocked areas for the lifting hook (cf. FIG. 5, No. 505) are likewise shown, whereby it can be seen by one look which path the crane may travel. Gestures and positions can likewise also be detected to carry out specific functions for the operation and setting of the crane, of the pieces of equipment, of the cabin, of the display, of the control stand, and of the construction site management programs.

A specific sensor interface can also be provided here that serves the detection of the fingerprint and of the movement and/or of the pressure. Operating functions likewise configured in a personal manner can thereby be assigned to individual fingers. Alternatively or additionally, gestures and positions can also be detected to carry out specific functions. Operating elements can e.g. only be faded in at non-hidden points on an approach of fingers to the display to ensure better clarity or to enable the simplified switchover of display images.

The surface structure of the display can advantageously be changed in an electrically personalized manner to make operating elements tactile and to generate vibrations or even sound. This enables the tactile feeling of operating elements, hazards, structures, and information via point-like or areal vibrations or noises to be transmitted to the operator. Required and personalized information can be faded in at free, visible points configurable in a personalized manner on the basis of the detection of the hand and of the direction of gaze of an operator, which can take place, for example, optically, in a technical radar manner, capacitively, inductively and/or by one or more cameras to ensure better clarity. The positions of the display elements and personalized information are/is advantageously dynamic and change position on the movement of the hand and/or of the head to always be visible to the operator.

A further option provides an ergonomically shaped haptic 3D touch display having a sensor surface (FIG. 5, No. 502) on the upper side of the chair arm (FIG. 5, No. 501), with the control lever being able to be omitted. The total construction site with the device to be controlled—in particular the building crane and optionally further construction machinery such as excavators, crawlers, etc.—can be imaged on this display and required situations can be marked or otherwise highlighted (FIG. 5, No. 503). Different camera positions and animations are presented to the operator here, preferably based on personalized requirements.

Required information can be tactilely emphasized. This simplifies the tactile feeling of information, hazards, structures, and control elements without having a direct view of the display. The desired destination positions (FIG. 5, No. 504) (e.g. taking up and placing down of the load) and a desired travel path, horizontally and/or vertically, (FIG. 5, No. 506) can be specified to the autonomous crane. The destinations and travel paths can be prioritized or shown in animated form after receipt of a job. Different shapes and colors as well as a dynamic numbering with figures and/or letters can be used for individual personalized representation. The prioritization of the required work jobs is thereby presented in simplified form. The desired jobs can be communicated to the control by the construction site staff or by the construction site management via a radio or cable connection. Jobs of a plurality of cranes can also be shown on the display here.

There is also the possibility of taking over the control of a different device over a radio or cable connection, whereby a plurality of devices can be operated by one crane operator. Blocked areas for the lifting hook (cf. FIG. 5, No. 505) can likewise be shown, whereby it can be seen by one look which path the crane may travel.

Gestures and positions can likewise also be detected to carry out specific functions for the operation and setting of the crane, of the pieces of equipment, of the cabin, of the display, of the control stand, and of the construction site management programs.

Operating elements are advantageously only faded in on an approach of the fingers to the display to ensure better clarity.

The functions for the operation and setting of the crane, of the pieces of equipment, of the cabin, of the display, of the control stand, and of the construction management programs can also be actuated directly via operating elements (FIG. 5, No. 508) or via a presented reticule or other operating symbols (FIG. 5, No. 507). Applied travel commands can be stored via sound and vibration to be noticeable for the operator, whereby a plurality of senses are addressed for perception.

Required and personalized information can be faded in at free, visible personalized points on the basis of the detection of the hand and/or of the direction of gaze of the operator by a position encoder, which can take place, for example, optically, in a technical radar manner, capacitively, inductively and/or by one or more cameras to ensure better clarity. The positions of the display elements and personalized information are/is advantageously dynamic and can change position on the movement of the hand and of the head to always be visible to the operator.

To enable a large-area visualization, further displays having the same or similar properties can also be attached in the working environment.

Figure 6:
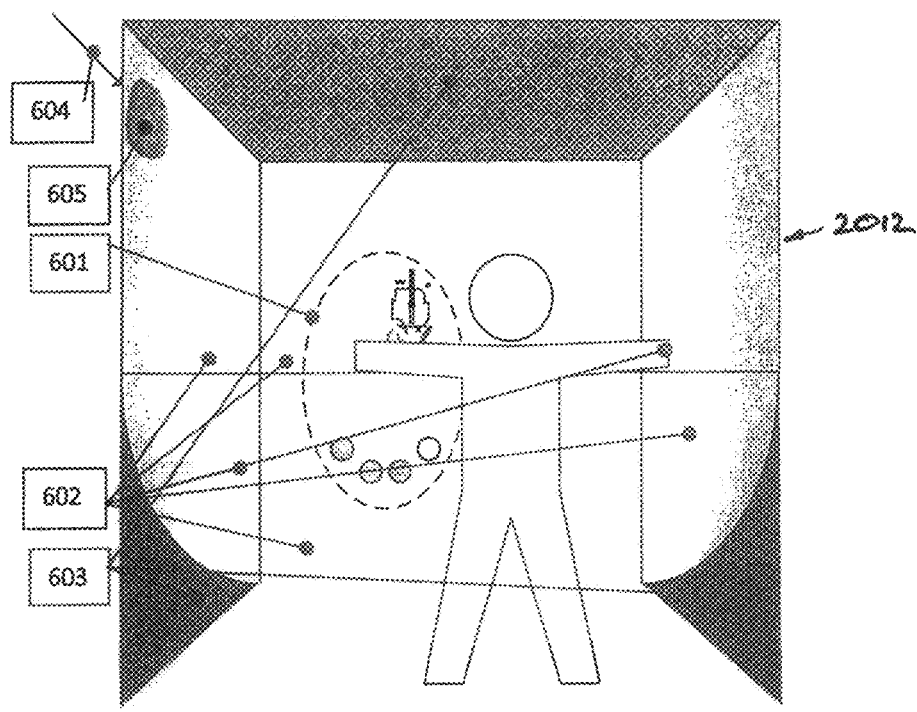
FIG. 6: a schematic representation of a large-area visualization and operating interface that is implemented on the cabin wall and/or cabin glazing of the control stand.

A further option provides a large-area, preferably freely configurable personalized, 3D visualization interface and operating interface, which can be implemented, for example, via 3D displays integrated in the cabin glazing (FIG. 6, No. 601) and/or in the trim (FIG. 6, No. 602), e.g. based on OLED technology with or without a transparent background, and/or via a projected 3D visualization such as head-up displays and/or smart glasses. The operating interface can here be implemented by an ergonomic haptic touch surface and via a whole-body gesture control. This enables a visualization and operation directly in the field of vision (FIG. 6, No. 603) of the operator.

Required and personalized information as well as operating elements can here also always be presented on a changed position of the field of vision. Disruptive components in the field of vision such as the boom can be masked by a camera image of the background image present behind it to also enable a view behind the disruptive component. The disruptive component thus becomes invisible.

Alternatively or additionally, the incident sunlight (FIG. 6, No. 604) can also be darkened at spots or regionally and preferably in a configurable personalized manner (FIG. 6, No. 605) via the display technology. It can also be implemented via a glass pane or film changeable in an electrically personalized manner. The operating and display concepts already described in the preceding displays can likewise be implemented with this configuration of the display apparatus.

All or some of the displays attached in the cabin can advantageously adapt their luminosity and volume to the environment. The brightness and/or volume can be detected in an integrated manner via sensors at the control stand, in space, on the crane and/or in the display so that the displays can be adapted to the surroundings to be able to make possible a non-disruptive visualization.

Different combinations of sensors and displays or display apparatus are possible here. All the sensors, drives, projectors, and displays present in the cabin and on the crane can also occur in different constellations and differently than described as a combined unit, e.g. in the form of a display having a brightness sensor, a rain sensor, and a light sensor with a head-up display projector.

Figure 17:
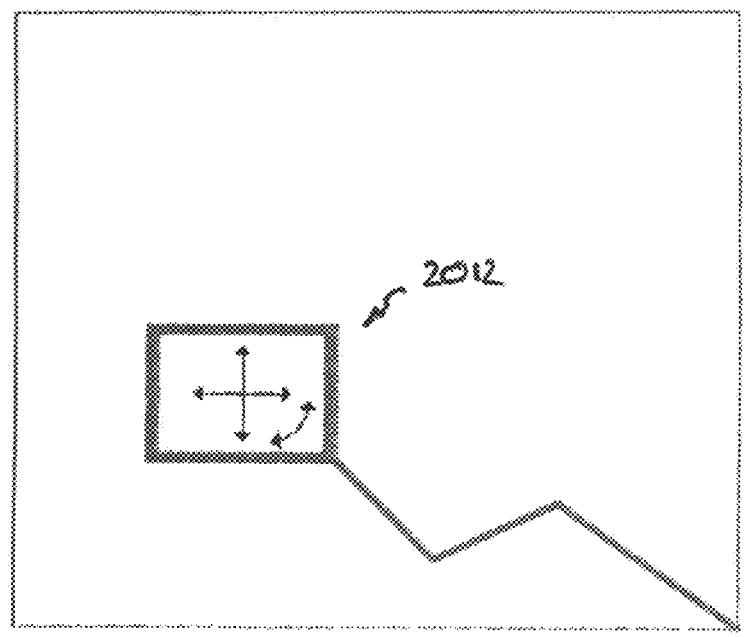
FIG. 17: a schematic representation of a display apparatus whose position relative to the seat of the control stand is dynamically adjusted during the operation of the machine to be controlled.

As FIG. 17 illustrates, all or some of the displays attached in the cabin can have a GPS sensor, a compass sensor and/or a gyroscope sensor or can be controlled in dependence of signals thereof. There is thereby in particular the possibility of adapting the display image to the desired horizontal and vertical display arrangement. The display can be freely positioned in space via a multi-joint arm or via a linear unit having position-monitored drives, cf. FIG. 17. The positioning can take place manually by hand here and also via 3D operating elements. The arrangement can be stored in a personalized manner in all cases, with settings being able to be automatically saved. The display can likewise be oriented in space in dependence on the head movement that can be detected via a camera image or via movement sensors. The camera image in the display can also be oriented according to the compass direction to always display the desired camera position and camera direction.

The seat 2015 of the operator and the total control stand are advantageously equipped with electrical and/or pneumatic drives to enable a seat setting configurable in a personalized manner. The control of the drives can take place via a BUS system and via radio here.

Figure 7:
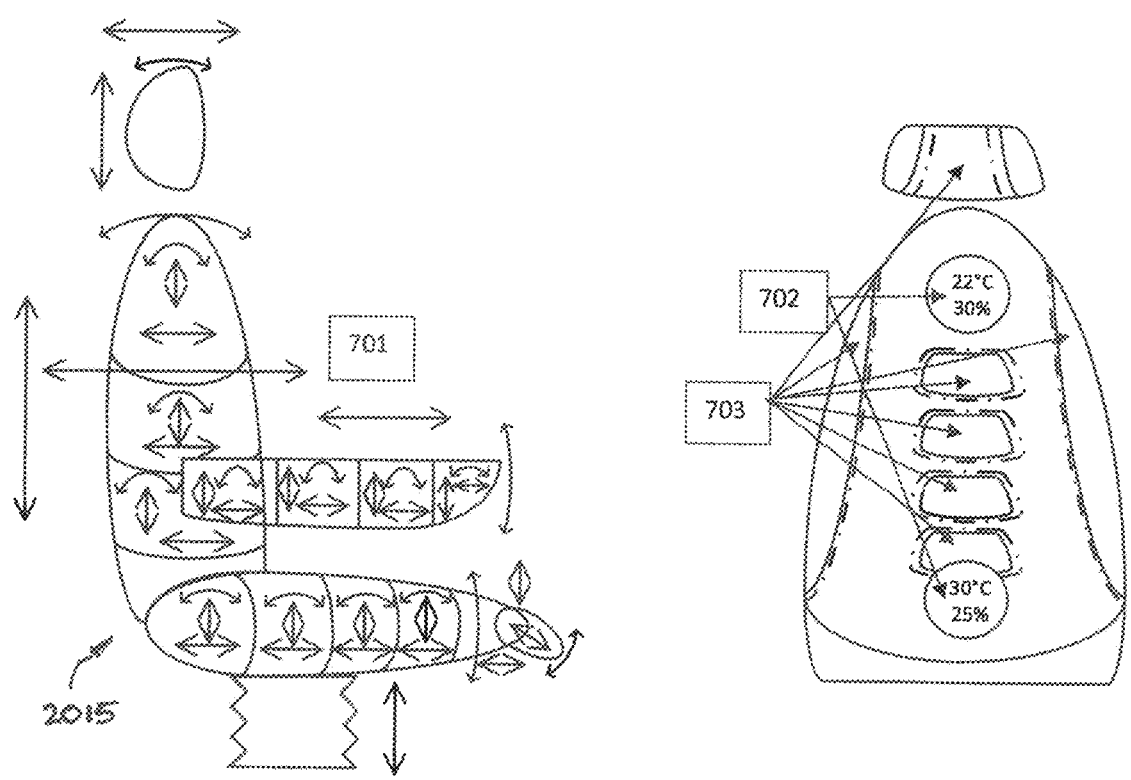
FIG. 7: a schematic representation of the seat of the control stand that shows its divisions into different zones and their adjustability.

The seat 2015 can be divided into a plurality of elements (FIG. 7, No. 701) that can be individually adjustable. Different climate zones can be predefined in position, size, and contour via inputs for display, gestures, and voice via heating elements, cooling elements and/or ventilation elements in the individual elements (FIG. 7, No. 702). The settings are saved in a personalized manner and can also be invoked via a date and time input to enable a best possible relief of individual body areas.

The seat can also have a massage function in which individual elements carry out movements (FIG. 7, No. 703) to loosen the muscle groups and thereby to prevent physical injury due to long periods of sitting and to increase the concentration.

The seat advantageously automatically or semiautomatically adapts to the physical stature of the operator. This can be detected via pressure sensors in the seat surface and/or optically via a camera system.

The total control stand and/or its seat 2015 advantageously adapts/adapt in position and alignment independently to the required field of vision of the operator to enable a pleasant viewing position. The direction of gaze can here be detected via movement sensors and/or optically via a camera system. Alternatively or additionally, the direction of gaze can also be determined by calculation from the position of the load or of the load take-up means.

Figure 8:
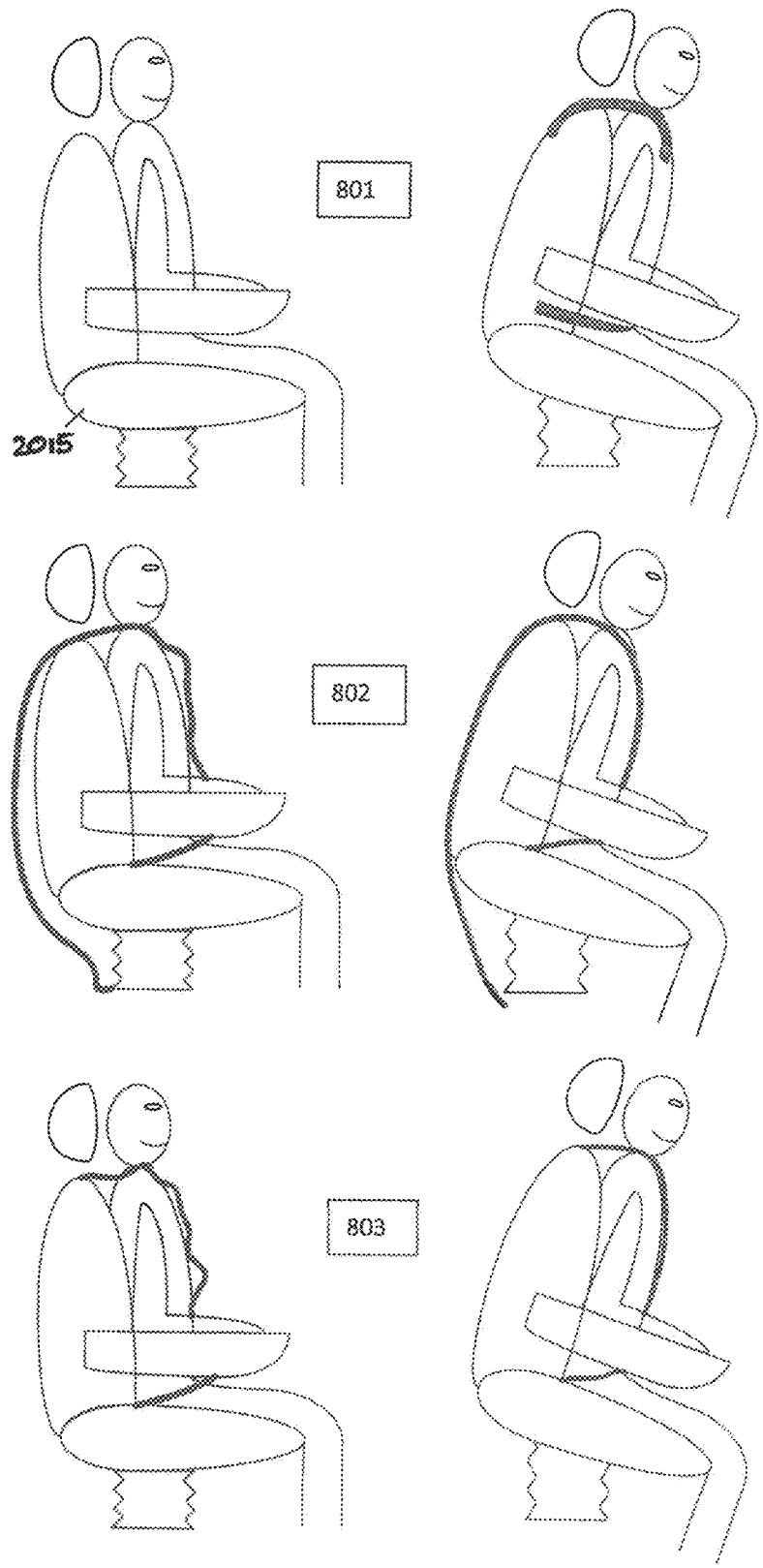
FIG. 8: a schematic representation of the seat of FIG. 7 in a side view, with its tiltability and the associated adjustment of a holding hoop or safety belt being shown.

If a tilt of the seat is required or helpful, holding hoops can be electrically extended (FIG. 8, No. 801) and loosely fitting holding belts can be tensioned via the adjustment of the seat (FIG. 8, No. 802) and/or electrically (FIG. 8, No. 803). More sitting comfort is thereby ensured with a dispensability of taut holding belts or holding hoops and a time-consuming and also error-prone belt application is dispensed with by the automation.

Alternatively or additionally, the seat 2015 can also have an electric, hydraulic and/or pneumatic rotation apparatus. Ingress is facilitated by the rotation of the seat 2015 and the field of view is increased by a rotation based on the situation or by a manual rotation. The seat can also be vertically adjusted in an electrical, pneumatic and/or hydraulic manner. The optimum seat height for the operator can thereby be made possible in a personalized manner and a position for a facilitated entry into the seat 2015 can also be made possible.

To enable the machine operator to have an optimum temperature, air quality and/or air humidity in the crane cabin or at the control stand, these operating parameters or at least individual ones thereof can be specified via voice commands and/or gesture commands and/or touch commands on display units and/or other operating devices and can be controlled or regulated by an air conditioning system.

Figure 9:
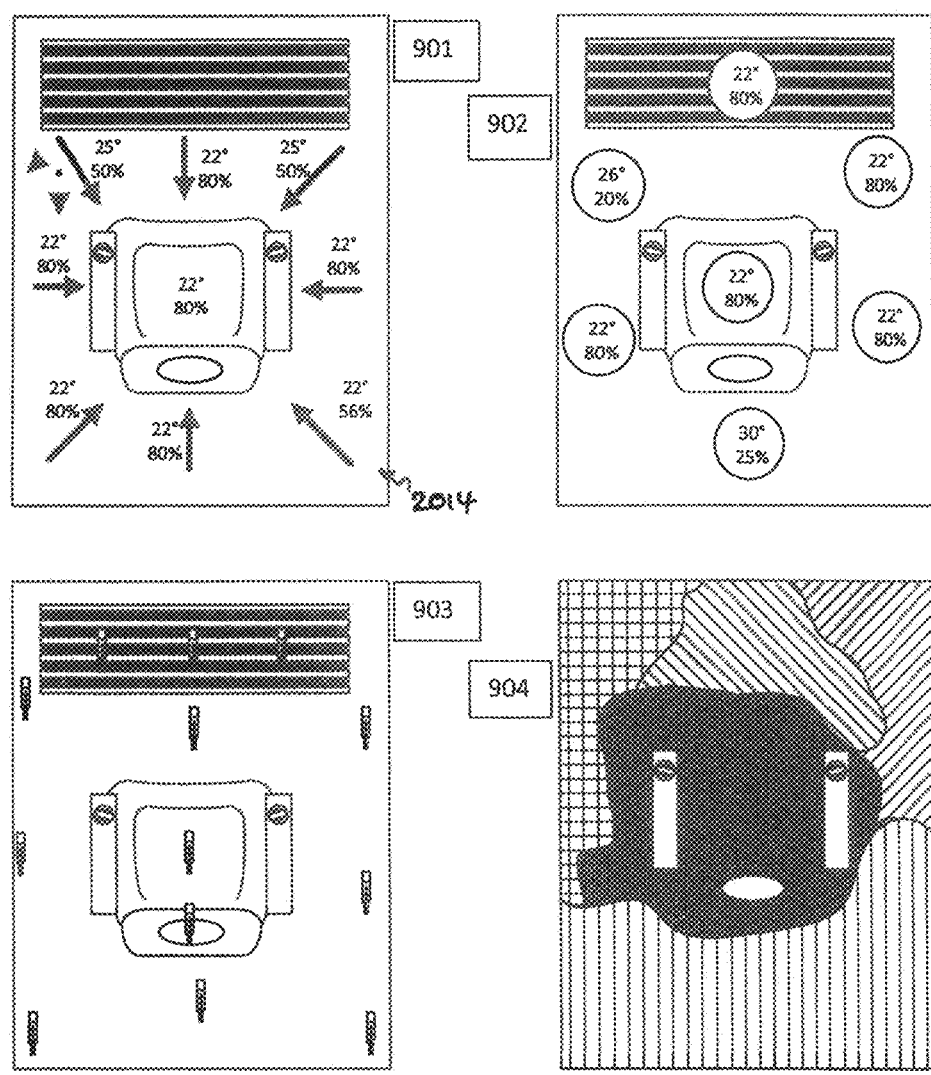
FIG. 9: a schematic representation of control interfaces for the individual setting of an air conditioning system and its climate zones.

In this respect, a regulation can take place via a detection using a plurality of temperature sensors, air humidity sensors and/or air quality sensors installed in the cabin (FIG. 9, No. 903) and/or via one or more thermal imaging cameras, with a plurality of climate zones advantageously being able to be specified and set in position, size and/or contour (FIG. 9, No. 902).

The direct sunlight can advantageously also be compensated (FIG. 9, No. 904). The direct sunlight can be determined via brightness sensors inside and/or outside the crane cabin.

There is likewise the possibility of specifying the direction of the air streams and/or a plurality of climate zones via voice commands and/or gesture commands and/or touch commands on displays and/or other operating devices (FIG. 9, No. 901).

A regulation of the fresh air and of the oxygen content can take place manually and automatically. The cooling and heating of the cabin can take place via air and via liquid components, gas components or electrical climate components in the side walls, roof, and floor.

The crane cabin or the control stand furthermore advantageously has a voice/audio and communication system that can comprise a combination of a plurality of devices in the form of a complete unit. The voice/audio and communication system can here advantageously be operated via the central displays or sensors in the crane cabin by voice commands and/or gesture commands and/or touch commands on displays and/or other operating units.

Addresses and data can advantageously also be streamed using suitable communication means via a radio or cable connection. Text and voice communication can be accepted and initiated via the voice commands, gesture commands and touch commands on displays and operating units.

Figure 10:
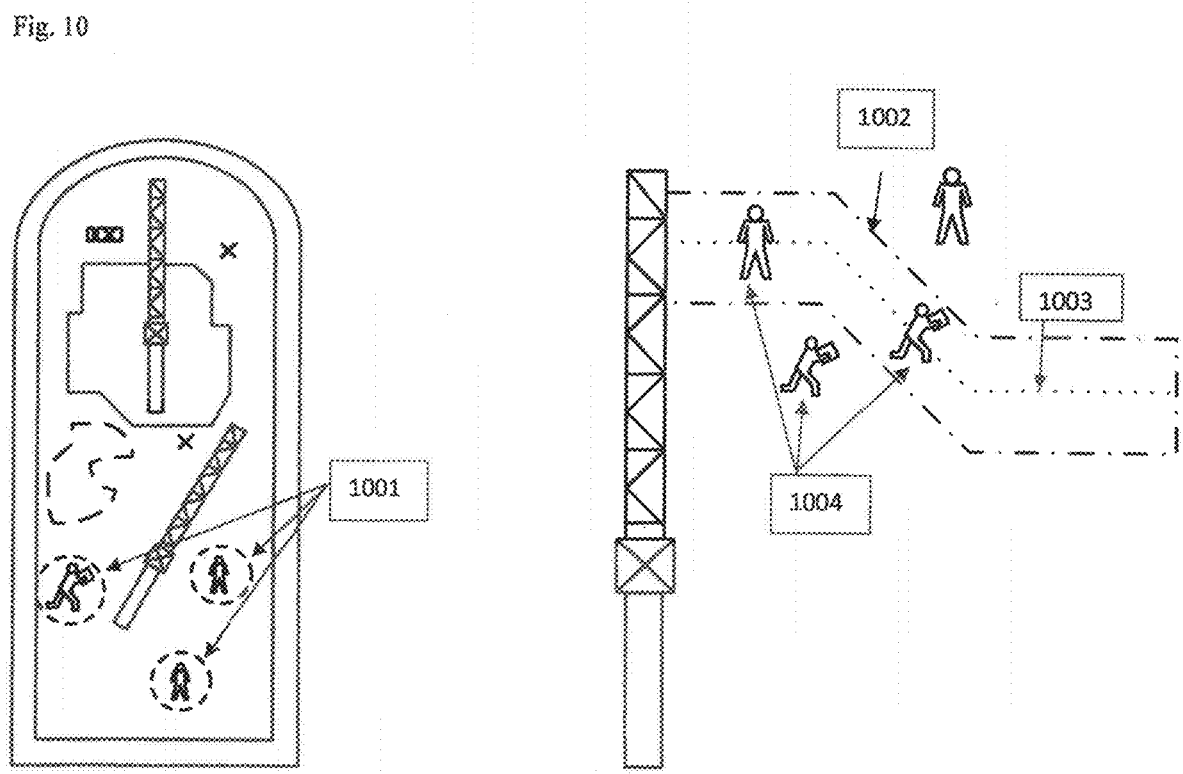
FIG. 10: a schematic representation of the communication system of the control stand for communicating with third persons and their visualization on the display apparatus of the control stand.

The construction site shown on the integrated displays advantageously optically highlights persons on the basis of GPS authentication and/or camera authentication (FIG. 10, No. 1001) with which a text and voice communication over radio or via a cable connection can be set up via voice commands and/or gesture commands and/or touch commands on displays and operating units.

If the crane carries out an autonomous travel movement or a travel movement triggered by the operator (FIG. 10, No. 1003), the crane can automatically transmit, or the operator can transmit, a text message and/or a voice message or a different message, for example in the form of a vibration, from a message device to the respective persons (FIG. 10, No. 1004) on the construction site if they are present in the current or future hazardous range (FIG. 10, No. 1002) starting from the load movement and travel movement.

Cabin functions and travel functions released in a personalized manner can also be carried out via voice.

Messages and other required or helpful information (such as the crane status, messages from the crane control, current weather report, or similar) can be queried in a personalized manner via voice input. The information and communications are preferably communicated to the crane operator by sound or in a graphical representation. The communication system furthermore preferably provides a radio and/or cable interface to a higher ranking management and control system (e.g. BIM) and optionally also to the public internet.

The control stand furthermore advantageously has an emergency call and/or warning system that can preferably have an emergency call button that makes possible communication over a radio or cable connection, for example to an emergency dispatcher, to a crane hire company and/or to the security center of the construction site. On actuation of the emergency call button, a voice message can be automatically transmitted in which the status of the crane is communicated, e.g. the position, setup, availability of an elevator, and the possibility of invoking or operating camera systems. There is likewise the possibility of the affected person himself being able to communicate with corresponding persons.

An emergency call can also be emitted automatically to persons defined in a personalized manner, e.g. when the crane has a specific error or is in a critical situation. Messages can also be communicated to the surroundings via display instruments and loudspeaker systems. The system can also transmit freely definable camera images that are required for the first accident estimation.

If critical weather forecasts are present for the crane, freely definable persons are informed of the status and of required measures for safety. The weather data are here communicated to other cranes from the weather services or weather stations via a radio or cable connection.

Figure 11:
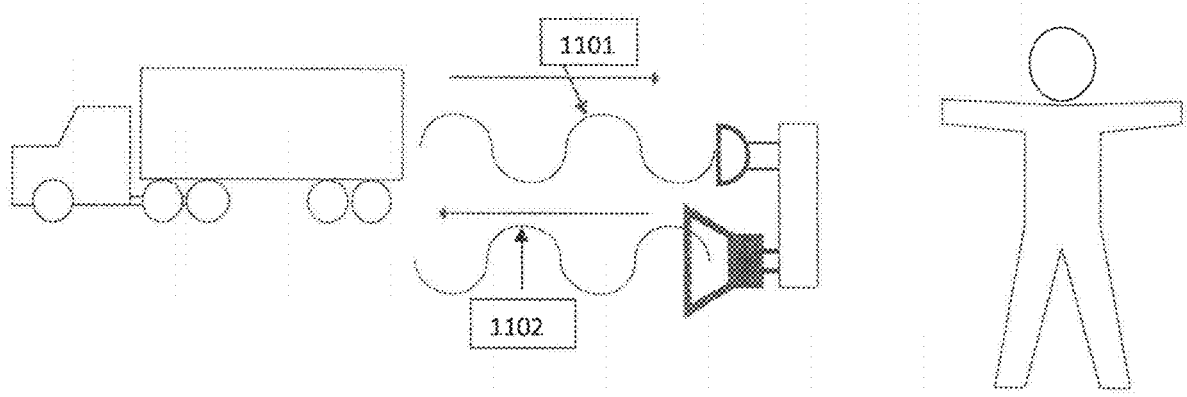
FIG. 11: a schematic representation of an active noise reduction system of the control stand for reducing environmental noise, with a microphone comprising environmental noise and a loudspeaker generating the active noise being shown.

A reduction of environmental noise via active noise can advantageously be provided at the control stand. The control stand preferably has an active noise reduction system for this purpose. The sound incident on the cabin (FIG. 11, No. 1101) is here recorded via at least one microphone and is compensated via active noise (FIG. 11, No. 1102) that is generated by at least one loudspeaker.

Different positions of the microphones and loudspeakers may be required for optimum efficiency depending on the situation. The microphones and loudspeakers can here be located outside the cabin (FIG. 12, No. 1201), in a double wall (FIG. 12, No. 1202), inside the cabin (FIG. 12, No. 1203) or in a combination of a plurality of such arrangements. The installation location of the microphones and loudspeakers can likewise also be different.

Figure 12:
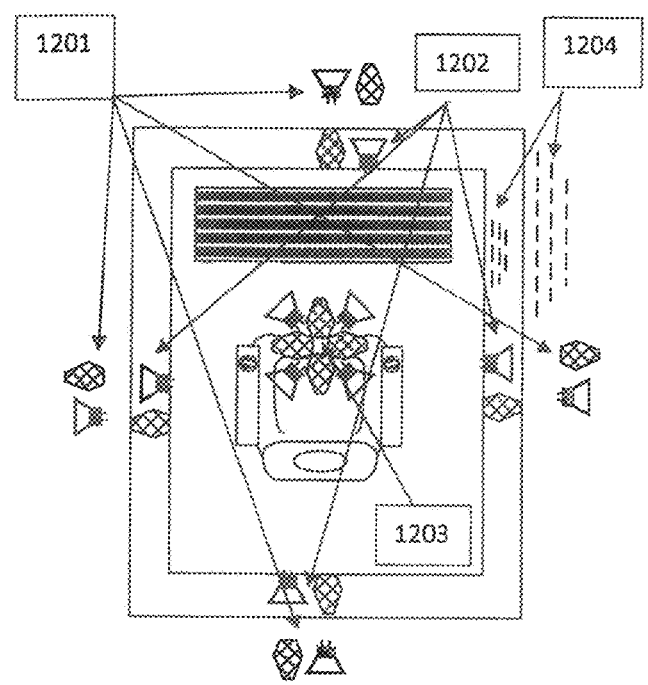
FIG. 12 a schematic representation of the arrangement of the components of the active noise reduction system of FIG. 11 at different points of the control stand and of its cabin walls.

The cabin walls and glazing can themselves also be used as loudspeakers in that they are, for example, electrically made to vibrate at points (FIG. 12, No. 1204). A haptic interface on the glazing can likewise generate the required active noise via vibrations.

Sound defined in a personalized manner is preferably compensated in regions defined in a personalized manner by the active noise reduction system. This relieves the crane operator of loud environmental noise, whereby he can concentrate on relevant warning signals that are compensated depending on the safety relevance or on the personalized configuration.

In accordance with a further aspect, the control stand comprises a windshield cleaning system that can in particular comprise at least one windshield wiper 2016, cf. FIGS. 13*a*-13*i*.

At least one motor, preferably a BUS controlled motor, can be provided as the windshield wiper drive and can have or be associated with a position-related load recognition, speed regulation, and position detection. The supply voltage of the at least one motor can advantageously also be monitored. New possibilities of implementing a movement that saves the windshield wiper arise through these options.

The windshield wiper drive advantageously recognizes the region of an overload. If an overload occurs on the screen, for example due to contamination, the drive only attempts to remove the contamination of the screen by a torque or force not harmful to the drive and mechanism. If this is not possible, the windshield wiper 2016 only cleans the non-contaminated region (FIG. 13*a*, No. 1301), i.e. the wiping region is restricted to a region not affected by the obstacle or is set to a region in which the torque compatible with the drive and the mechanism is sufficient or is not exceeded. Alternatively or additionally, an overload switching can take place to save the mechanism and the windshield wipers.

Figure 13A:
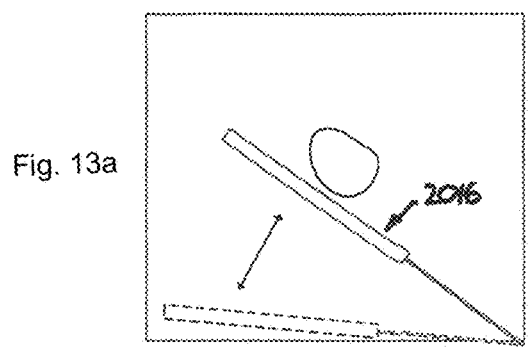
FIGS. 13a-13i: a schematic representation of a glass cleaning system of the control stand from the preceding Figures, wherein a collision switch of the windshield wiper, alternatingly different positions of rest of the windshield wiper, a service position of the windshield wiper, the interplay of a plurality of windshield wipers, an automatic raising of the windshield wiper on collisions, the arrangement of a common drive for two windshield wipers on differently inclined windshield zones, the length variability of a windshield wiper arm, a horizontal travel capability of the windshield wiper and a vertical travel capability being shown in the different partial views illustrated in FIGS. 13a-13i.
Figure 13B:
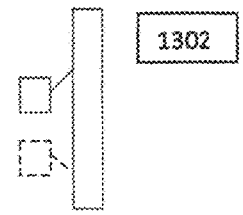

The wiper blade position advantageously changes the position of rest after the end of the wiping cycles to prevent a unilateral deformation of the wiper by a constant position of rest (FIG. 13*b*, No. 1302).

Figure 13C:
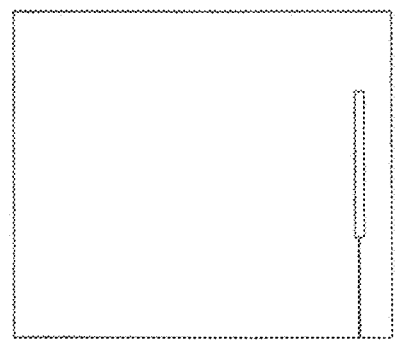
Figure 13D:
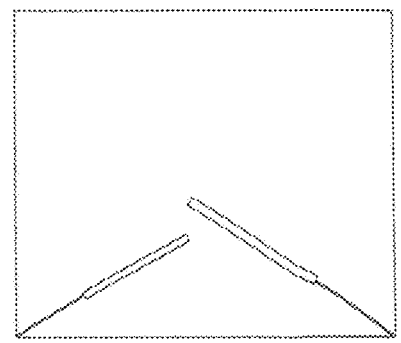

The windshield wiper can likewise be moved into a service-friendly position in a service case (FIG. 13*c*, No. 1303).

An electronic collision recognition with other windshield wipers can take place via an algorithm on the basis of an angle detection and/or movement detection (FIG. 13*d*, No. 1304), whereby an expensive mechanism taking up a lot of room can be dispensed with.

The required field of view can be calculated in accordance with a further aspect via, for example, the direction of gaze of the crane operator detected by the camera and/or sensor. A wiper control apparatus can restrict and/or adapt and/or dynamically move the wiping field of the windshield wiper in dependence on a desired field of view or on a field of view determined in such a manner. The wiper control apparatus can for this purpose also determine the position of the load take-up means and/or the load and can take it into account for the calculation of the wiping field.

Only a minimal region actually required or desired is hereby wiped or cleaned on the windshield, whereby faster wiping cycles are made possible due to shorter distances.

A manual selection of the wiping region, configurable in a personalized manner, is likewise also possible A wiping water tank advantageously has a recognition of the filling level or comprises a level sensor to advise the crane operator of the need for a top up.

The windshield cleaning system advantageously has one or more rain sensors and/or light sensors that detect whether the windshield is contaminated, for example optically, capacitively and/or via a resistance measurement. The directions and the luminosities of surrounding light sources can here also be optically recorded.

With dry contamination, a spray system is preferably automatically activated for the windshield cleaning. It if is wet contamination, an additional switching on of the spray system is not required. The detection of the degree and of the direction of the direct light enables the automatic switching on and regulation of lighting systems inside and outside the crane cabin and of the construction site lighting. The glazing panes can likewise also be darkened by an electrically changeable film or glass pane in a personalized manner in the regions through which the sun shines.

This can likewise also not take place electrically via a light-changeable material.

A rain sensor provides a huge advantage in the crane movement for the crane operator. If the crane takes up a load in which the rain comes from behind, the windshield wiper would run dry. In this case, the sensor recognizes that there is no rain or little rain on the glazing pane and reduces or stops the wiping movement. If the crane now turns into the rain, the sensor recognizes the rain and starts or increases the speed of the wiping process.

Figure 13E:
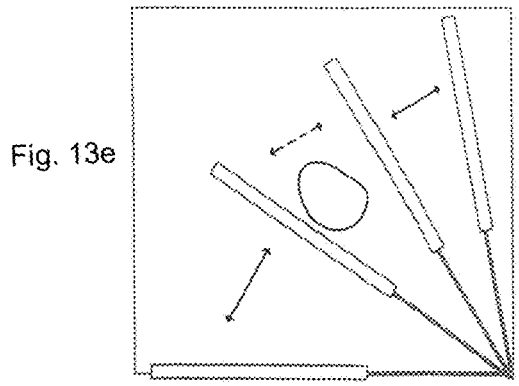

An electric, hydraulic and/or pneumatic drive having position detection at the wiper arm and at the wiper advantageously enables the automatic setting upright of the wiper blade. The wiper blade thereby automatically moves away from the glazing at low temperatures so as not to freeze. Contaminated regions whose contamination cannot be removed can likewise be avoided by raising the wiper blade (FIG. 13*e*, No. 1305).

Figure 13F:
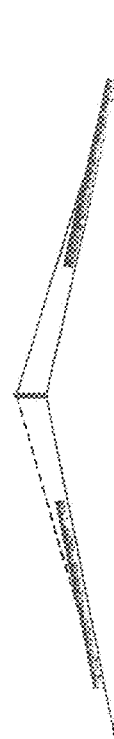

There is also the possibility of reaching two panes having different slants using one drive (FIG. 13*f*, No. 1306).

Figure 13G:
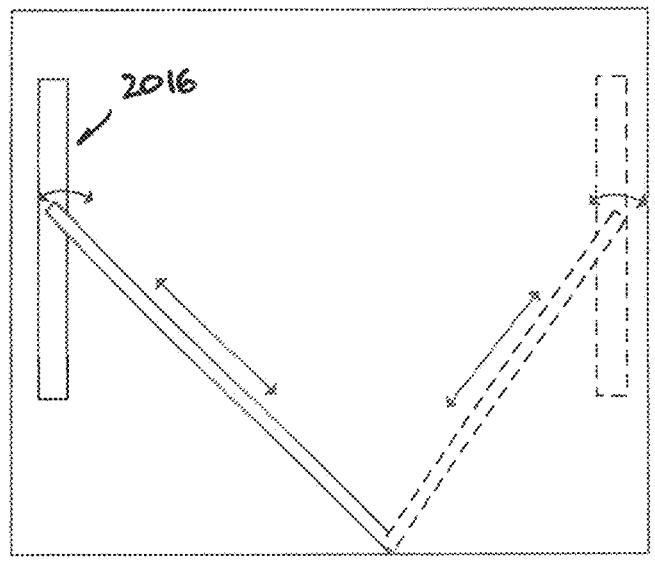
Figure 13H:
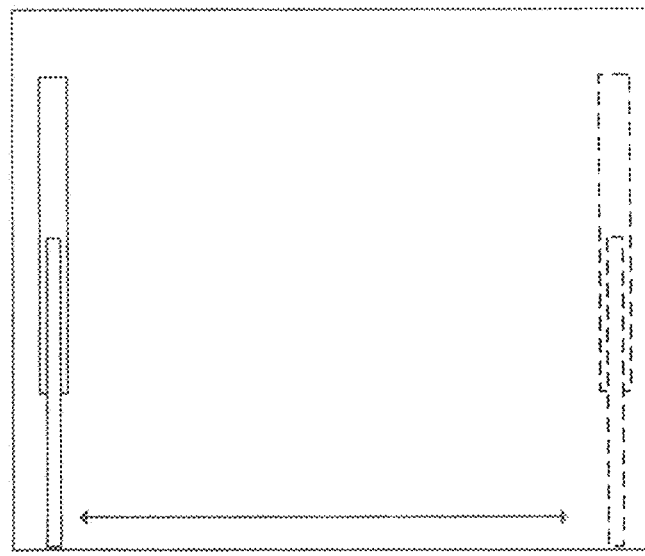

A preferably position-monitored adjustment drive that can configured as working electrically, hydraulically and/or pneumatically and that is associated with a wiper arm can advantageously vary the length of the wiper arm, whereby the wiper field can be further adapted, cf. FIG. 13*g*.

In this respect, a preferably positioned-monitored rotary drive that can be configured as working electrically, hydraulically and/or pneumatically can be associated with the wiper to monitor or adapt the angular range swept over by the wiper. This also makes it possible to implement an at least approximately rectangular wiping field using one rotary drive, cf. FIG. 13*h*.

Figure 13I:
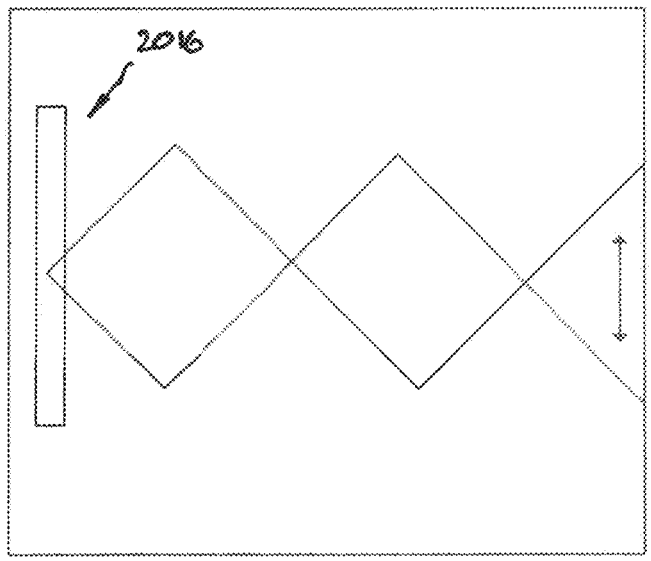

A horizontal position-controlled drive of the windshield wipers is also possible that can move the wiper horizontally or vertically, for example via a position-monitored linear unit that can be driven electrically, hydraulically and/or pneumatically, cf. FIG. 13*i*.

In accordance with a further aspect, a cabin lighting comprising illuminants that can be controlled via a BUS system or via a connection-programmed control is provided. The illuminants can advantageously be changed in color and/or brightness. New possibilities thereby arise to use them for communication between the construction machine and the operator.

The illumination can in particular be controlled or used for a color communication of information (e.g. color red: danger; yellow: pre-warning; green: machine started).

Light colors and/or luminosities can advantageously be individually varied in different lighting regions, with a control in particular being able to be provided in dependence on an operating parameter and/or on an environmental situation. For example, only those regions can change their color that are in the direction of a hazard. If, for example, a warning based on a collision is produced to the left rear of the control stand or crane, the color of the lighting can automatically be made red in this region.

There is alternatively or additionally also the possibility of implementing different flashing patterns in different colors or in the same colors and/or in different luminosities.

If it becomes darker outside the cabin, this can be detected by a brightness sensor, with the brightness in the cabin or in the control stand, for example, being able to be increased as the darkness increases.

All the lighting functions can advantageously be configured by the user and stored in a personalized manner in the control. The individually preferred or best-suited cabin lighting is thereby present in every operating case. The current situation of the construction machine is evaluated by an algorithm and the corresponding desired lighting is implemented. Glare, reflection in the glazing can thereby be avoided and the eyes can be spared.

An electrically changeable glazing and/or film and/or a material changeable by the luminosity can help to avoid reflections that can, for example, be detected via a sensor and/or via a camera system. Such reflections can be avoided by adapting the glazing and/or film and/or the material changeable by the luminosity, which can preferably take place automatically in dependence on the sensor signals or camera signals and can include a change of the surface.

Specific contrasts in the perception of the cabin can likewise be highlighted by different colors in a situation by the aforesaid regional light color control and/or luminosity control.

The control stand advantageously furthermore comprises different assistance systems:

For a recognition of fatigue, physical reactions and/or physical behaviors can, for example, be detected by a camera and/or by an optical sensor system and can be compared in a personalized manner with already known and recorded patterns and/or the handling is detected and the detected handling is compared by an algorithm in a personalized manner with already known and recorded patterns. In the event of slight or large deviations from the reference patterns, the fatigue of the operator is drawn to his attention; in the event of large deviations, the crane control can take over or overcontrol or block the driving commands to avoid accidents. Persons at risk can likewise be warned via a mobile radio connection or visually via work spot lights Furthermore, assistance systems can also be provided for an economic and material-relieving manner of working. The control stand can, for example, have an algorithm in the control or on a central platform that it invokes via a cable or radio connection, that proposes the most economic, fastest, or most material-relieving manner of working and handling, also with respect to the load, and the safest control commands, or also proposes the characteristic of the desired value progressions of the control lever.

A communication on this can take place, for example, via a display or via the cabin lighting with different colors and/or via an increase or decrease of the counter-torque at the master switch, which can take place via an electric drive, via electrically changeable materials and/or via magnets. Said communication can be configured in a personalized manner. The operator can thereby be tactilely guided toward the optimum control command without the operator having to look at a display.

Figure 14:
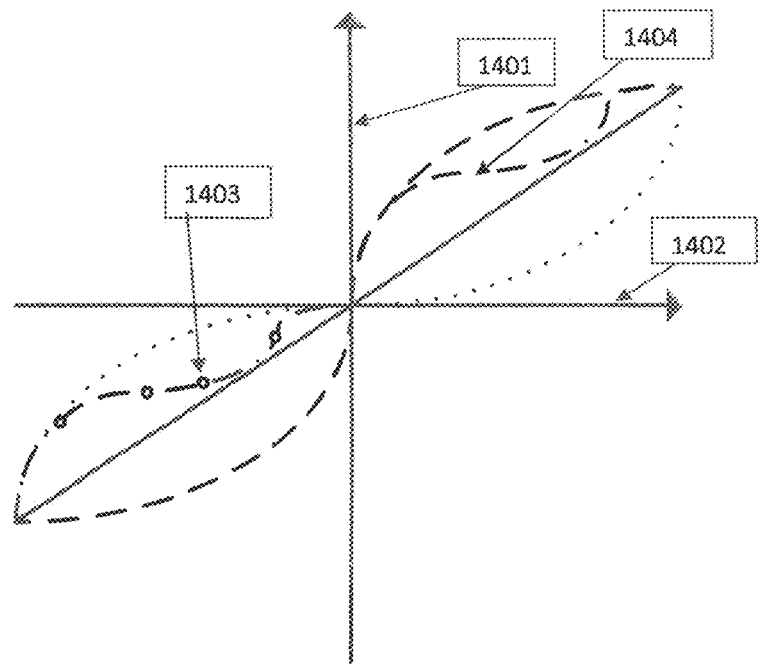
FIG. 14: a schematic representation of the characteristic line of a desired value progression of the control lever and its input possibilities for adapting the characteristic line to a machine operator.

The switching over of the modes of behavior can also take place manually and the assistance systems can also be configured in a personalized manner. The progression of the desired value (FIG. 14, No. 1401) of the master switch in dependence on the deflection (FIG. 14, No. 1402) can likewise be configured in a personalized manner via a value input or via a point displacement (FIG. 14, No. 1403) or the drawing (FIG. 14, No. 1404) via touch commands or voice commands on a display device or in another manner. The reaction of the crane or of the respective controlled machine can thereby be adapted to the operator.

An anti-collision system is furthermore advantageously provided. There is the possibility here of advising other cranes of the intended travel path to avoid a switch-off due to collision prevention in advance. A job-linked organization, preferably on the software side, of the travel paths of the manually controlled and/or autonomous cranes can prevent or at least reduce downtimes due to cranes standing in the travel path. The organization can take place in the crane controls or in a central platform.

A service management system is furthermore advantageously provided. The handling and/or the operating situations can be evaluated via an algorithm that is stored on a central management system or in the crane control. Varying service intervals of individual components or of a plurality of components can be fixed from it. The appointed time and the duration can be constantly invoked by the dispatcher, service staff, and by the crane operator online and via the crane control. Interfaces are likewise provided to higher ranking management and control systems (e.g. BIM).

All or at least some of the functions configured in a personalized manner can advantageously be stored and/or provided in an invokable manner in the crane control or centrally on an online platform via a radio and/or cable connection. The authentication of the operator takes place, for example, via an electronic key, optically via a camera system, smartphone, and/or via the reading of the fingerprint via a fingerprint scanner and/or via a touch display.

The supervisor can communicate the work plan and job list to the crane and to the operator on a communication means via a central online management. The control stand carries out all the personalized settings (e.g. the starting of the system, seat settings, control lever configuration, room climate) before the start of work so that the operator can immediately work through the job list communicated to the crane control and/or to the communication means.

There is likewise also the possibility that the operator can likewise register his start or end of work on a specific unit with the time and date on a unit via a communication means, with the control stand being able to carry out all the required settings in dependence thereon. The confirmation of the operator can take place via the authentication that can also be used for working hour detection, with this then likewise being able to be communicated to a portal.

Figure 15:
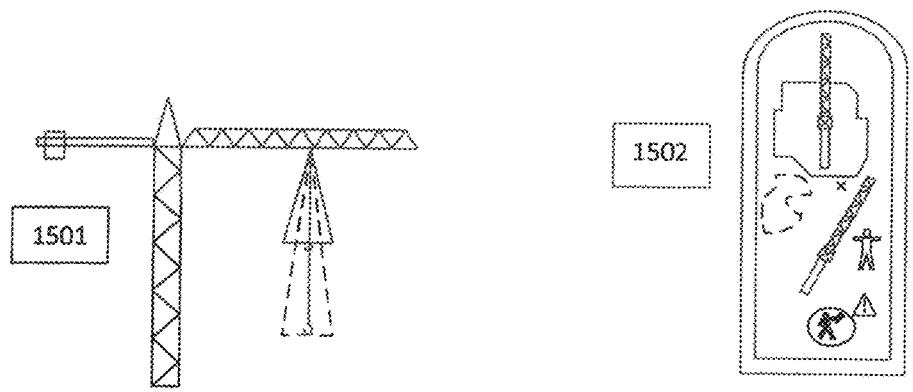
FIG. 15: a schematic representation of a camera system of the crane and of the objects filtered from the camera image and their representation on a display of the control stand.

As FIG. 15 shows, the crane 2000 can have a camera system that advantageously has at least one power zoom trolley camera that can be attached to the trolley of the boom, with its zoom being able to be rescaled automatically with the lowering depth (FIG. 15, No. 1501). The crane 2000 likewise advantageously has a plurality of cameras that enable a 360° plan view of the unit and of the construction site.

The cameras of the camera system can furthermore have an infrared and thermal image function that is suitable for night vision.

The construction site can likewise be monitored by the camera systems. Movements of persons can e.g. be registered and reported to a central station. The security staff are filtered via an authentication e.g. via a camera, GPS sensor, or a localization of radio transmitters or mobile communication means (FIG. 15, No. 1502).

A camera that can also record a 360° image is located directly at the hook and enables a simplified positioning and placing down of the load. The scaling of the camera to the size of the load takes place via an image evaluation. Ultrasound sensors at the crane hook detect the surroundings and enable indications in the display image on the distance from the objects detected in the camera image and on their size. The distance and size can also be calculated from the camera image via an algorithm.

The view of the counter-boom takes place via cameras that project images onto displays that are arranged in the cabin at the positions of the wing mirrors and/or rear view mirrors. There is likewise also the possibility of accessing the camera images beneath the cranes via a radio or cable connection to achieve a larger visual zone.

An intercommunication system to the crane cabin is advantageously mounted on the crane hook and enables a communication between construction workers and the crane operator. It has a microphone and a loudspeaker. There is likewise the possibility of setting up a communication with other cranes via a radio and cable connection.

Figure 16:
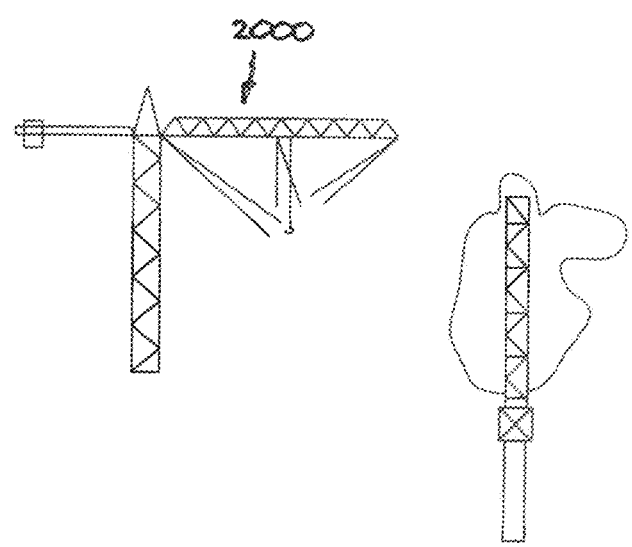
FIG. 16: a schematic representation of the lighting apparatus of the crane and its adjustability for lighting a desired crane environment.

As FIG. 16 shows, the crane 2000 can have one or more spot lights that can comprise illuminants having the possibility of presenting one or more colors. The illuminants here can also be located on a single microchip or on a plurality of microchips.

Due to the larger number of light sources, the zone of illumination and the light cone can be controlled and can optionally also be set without turning the spot lights by changing the luminosity (FIG. 16), with a turning of the spotlights nevertheless being able to be provided, however.

The spot lights can have suitable optics and/or laser illuminants to ensure strong spot illumination.

The zone to be illuminated can be configured in a freely personalized manner via a voice input or touch input on a display via an optical detection by cameras or sensors. Only required zones can likewise also be illuminated for operation such as lifting hooks or destination positions in a different color or also only the zones that are required for the security staff. The authentication of the staff is likewise used for this.

Travel movements, travel directions and/or travel paths can e.g. also be projected onto the construction site via laser light with the autonomous crane to draw the attention of construction site personnel to the situation. Persons present in the travel path can likewise be detected by a camera and can have their attention drawn with the help of the lighting.

The spot lights can be located at different positions on the crane such as on the lifting hook. Light smog is reduced and energy saved due to the point illumination.

Shaped light elements are likewise also attached to the crane and can give the crane a visual face at night. Displays can also be attached to the outside of the cabin that enable a visualization of advertising or other information, for example on the construction site. They can also be projected onto the outside via a projector.

We claim:

1. A control stand for controlling a machine, comprising:
 a detector for detecting a head position and/or a direction of gaze of a machine operator and/or an actual position of a take-up loader and/or a load;
 a display apparatus for displaying a change in position of display elements and/or control elements; and
 a computer configured to dynamically displace the display elements and/or the control elements on the display apparatus based on a detected head position and/or a detected direction of gaze of the machine operator and/or based on a detected actual position of the take-up loader and/or a detected actual position of the load such that the display elements and/or the control elements remain in a field of vision of the machine operator.

2. The control stand of claim 1, wherein the display apparatus comprises a touchscreen display of a gripping section of a control lever, and wherein the touchscreen display of the gripping section of the control lever comprises a three-dimensionally contoured display interface and/or a touch interface.

3. The control stand of claim 1, wherein the display apparatus comprises a display interface and/or an operating interface that at least partially forms and/or covers a cabin glazing of the control stand and/or a cabin wall trim of the control stand.

4. The control stand of claim 3, wherein the display interface and/or the operating interface comprises a touchscreen display and/or a gesture detection device for detecting gestures of the machine operator associated with the display interface and/or the operating interface.

5. The control stand of claim 3, wherein the display apparatus further comprises a fade-in device for importing a camera image in regions of the display interface and/or the operating interface onto a cabin section in which a vision-blocking element is present in a direction of gaze of the machine operator, and wherein the camera image includes a representation of a working area behind the vision-blocking element.

6. The control stand of claim 1, further comprising a communication apparatus for communicating voice messages and/or text messages, wherein the communication apparatus is linked to the display apparatus, and wherein the display apparatus comprises a communication display interface for displaying communication information.

7. The control stand of claim 6, further comprising a collision checker, wherein a possible collision with a communication partner is checkable with the collision checker, and wherein the communication apparatus is configured to automatically set up a communication link to the communication partner when the collision checker determines the possible collision with the communication partner.

8. The control stand of claim 1, further comprising a windshield wiper, wherein a wiping region of the windshield wiper is automatically settable based on the detected head position and/or the detected direction of gaze of the machine operator and/or based on the detected actual position of the take-up loader and/or the detected actual position of the load such that the wiping region of the windshield wiper is movable along with a field of vision of the machine operator.

9. The control stand of claim 1, wherein a color and/or luminosity in a lighting zone is changeable based on a signal of a collision checker.

10. The control stand of claim 1, further comprising an illuminant, wherein an orientation of the illuminant is configured to follow the take-up loader and/or the load based on the detected actual position of the take-up loader and/or the detected actual position of the load.

11. A control stand for controlling a machine, comprising:
 a seat;
 a detector for detecting a head position and/or a direction of gaze of the machine operator and/or a take-up loader position of a take-up loader and/or a load position of a load; and
 a seat orientation setting apparatus for automatic tilting and/or rotating of the seat based on a detected head position and/or a detected direction of gaze of the machine operator and/or a detected take-up loader position and/or a detected load position.

12. The control stand of claim 11, further comprising a holding belt and/or a holding hoop associated with the seat, wherein the holding belt and/or the holding hoop is configured to restrain the machine operator on the seat, and wherein the holding belt and/or the holding hoop comprises an automatic tightening apparatus for tightening the holding belt and/or the holding hoop based on a tilt of the seat.

13. The control stand of claim 11, further comprising:
 a detector for automatic detection of a physical stature and/or a girth of the machine operator; and
 a setting apparatus for an automatic setting of at least one operating parameter of the seat based on a detected physical stature and/or a detected girth of the machine operator.

14. The control stand of claim 11, wherein the detector has at least one pressure sensor in a seat surface of the seat, and an optical detector for detecting the physical stature of the machine operator, wherein at least one of the following operating parameters of the seat is settable: seat height; spring and/or damping force; seat tilt; backrest tilt; and side cheek contour.

15. The control stand of claim 11, further comprising a display apparatus for displaying information, wherein the display apparatus comprises a display interface and/or an operating interface that at least partially forms and/or covers a cabin glazing of the control stand and/or a cabin wall trim of the control stand.

16. The control stand of claim 15, wherein the display interface and/or the operating interface comprises a touchscreen display and/or a gesture detection device for detecting gestures of the machine operator associated with the display interface and/or the operating interface.

17. The control stand of claim 15, wherein the display apparatus further comprises a fade-in device for importing a camera image in regions of the display interface and/or the operating interface onto a cabin section in which a vision-blocking element is present in a direction of gaze of the machine operator, and wherein the camera image includes a representation of a working area behind the vision-blocking element.

18. The control stand of claim 11, further comprising a windshield wiper, wherein a wiping region of the windshield wiper is automatically settable based on the detected head position and/or the detected direction of gaze of the machine operator and/or based on the detected take-up loader position and/or the detected load position such that the wiping region of the windshield wiper is movable along with a field of vision of the machine operator.

19. The control stand of claim 11, wherein a color and/or luminosity in a lighting zone is changeable based on a signal of a collision checker.

20. The control stand of claim 11, further comprising an illuminant, wherein an orientation of the illuminant is configured to follow the take-up loader and/or the load based on the detected take-up loader position and/or the detected load position.

\* \* \* \* \*